United States Patent [19]
Ota

[11] Patent Number: 6,001,013
[45] Date of Patent: Dec. 14, 1999

[54] VIDEO DANCE GAME APPARATUS AND PROGRAM STORAGE DEVICE READABLE BY THE APPARATUS

[75] Inventor: Izumi Ota, Tokyo-to, Japan

[73] Assignee: Pioneer Electronics Corporation, Japan

[21] Appl. No.: 08/906,312

[22] Filed: Aug. 5, 1997

[30] Foreign Application Priority Data

Aug. 5, 1996 [JP] Japan .................................. 8-206234
Sep. 30, 1996 [JP] Japan .................................. 8-258331

[51] Int. Cl.$^6$ ........................................................ A63F 9/22
[52] U.S. Cl. ................................................ 463/7; 434/250
[58] Field of Search .................................. 463/1, 4, 7, 8, 463/9; 434/247, 250; 273/454

[56] References Cited

U.S. PATENT DOCUMENTS 5,513,129  4/1996  Bolas et al. .............................. 364/578
5,792,031  8/1998  Alton ........................................ 482/78

*Primary Examiner*—Jessica J. Harrison
*Attorney, Agent, or Firm*—Finnegan, Henderson, Farabow, Garrett & Dunner, L.L.P.

[57] ABSTRACT

A video dance game apparatus for displaying an image of at least two dancers on a screen and controlling the dancers to play various dance performances in accordance with an external operation to thereby offer a dance game, is provided with: an image displaying device for displaying the image of the dancers; a dance music output device for outputting a music signal indicating a dance music; a beat information generating device for generating beat information on the basis of the music signal; a dance performance data selecting and reading out device for selecting and reading out one of the dance performance data pieces stored in a dance performance data memory device; an image control device for controlling the image displaying device to change the image of the dancers such that the dancers play a dance performance corresponding to the read out dance performance data piece; an operation device by which the external operation is inputted, for operating the dance performance data selecting and reading out device in accordance with the external operation to select and read out the one of the dance performance data pieces; and a score calculating device for calculating a game score on the basis of a time lag between a read-out timing of the dance performance data piece and a generation timing of the beat information.

40 Claims, 13 Drawing Sheets

VIDEO DANCE GAME APPARATUS AND PROGRAM STORAGE DEVICE READABLE BY THE APPARATUS

BACKGROUND OF THE INVENTION

1. Field of the Invention

The present invention relates to a video dance game apparatus, which displays at least two dancers on a screen and controls the dancers to play various performances on the screen by an external operation or drive to thereby allow a dance game, and also relates to a program storage device readable by the apparatus.

2. Description of the Related Art

There is a fighting game apparatus as one kind of a television game apparatus, in which two characters (i.e. two persons or fighters) are displayed on a screen. This is intended to control one character to play a performance by an external operation or drive to thereby defeat the other character. That is, two game players compete with each other or one game player competes with a computer by inflicting a damage to the competitor's character or defending one's own character from the competitor's character by a timing of playing the performance and a selection of the kind of the performance.

However, in such a conventional game apparatus, the timing of playing the performance may be a timing when an effective damage can be inflicted on the competitor's character. In other words, there is no game apparatus which involves competing for superiority or inferiority of sense of rhythm, such as moving a character on the screen in harmonization with or in time to a constant musical rhythm.

Moreover, in not only the fighting game but also most of the conventional game apparatuses, one game player competes against the other game player or the computer as for the operating or driving skill. There is no game of competing for the cooperation or harmonization between two game players.

SUMMARY OF THE INVENTION

It is therefore an object of the present invention to provide a video game apparatus in a perfectly new field for competing for a high score by letting at least two dancers on the screen play a dance cooperatively, and a program storage device readable by the video game apparatus for performing a video dance game.

The above object of the present invention can be achieved by a first video dance game apparatus for displaying an image of at least two dancers on a screen and controlling the dancers in the displayed image to play various dance performances in accordance with an external operation by a game player to thereby offer a dance game to the game player. The first video dance game apparatus is provided with: an image displaying device having the screen, for displaying the image of the dancers on the screen; a dance music output device for outputting a music signal indicating a dance music; a beat information generating device for generating beat information on the basis of the music signal; a dance performance data memory device for storing a plurality of dance performance data pieces each indicating respective one of the various dance performances; a dance performance data selecting and reading out device for selecting and reading out one of the dance performance data pieces stored in the dance performance data memory device; an image control device for controlling the image displaying device to change the image of the dancers such that the dancers play a dance performance corresponding to the read out dance performance data piece; an operation device by which the external operation is inputted, for operating the dance performance data selecting and reading out device in accordance with the external operation to select and read out the one of the dance performance data pieces, so as to change the dance performance of the dancers on the screen; and a score calculating device for calculating a game score on the basis of a time lag between a read-out timing, which is a timing at which the dance performance data piece is read out by the dance performance data selecting and reading out device in accordance with the external operation, and a generation timing of the beat information, which is a timing at which the beat information is generated by the beat information generating device.

According to the first video dance game apparatus, the image of at least two dancers is displayed on the screen by the image display device, while a music signal indicating a dance music is outputted by the dance music output device. In this condition, the game player operates the operation device, such as button switches, drive levers, a keyboard, a mouse, a joy-stick or the like, and inputs the external operation by the operation device in accordance with this dance music. Then, the dance performance data selecting and reading out device is operated, so that one of the dance performance data pieces stored in the dance performance data memory device is selected and read out by the dance performance data selecting and reading out device. Thus, under the control of the image control device, the image of the dancers is changed by the image displaying device such that the dancers play a dance performance corresponding to the read out dance performance data piece. Namely, the dance performance of one of the dancers in the displayed image is changed in correspondence with the read dance performance data piece. At this time, the dance performance of another of the dancers in the displayed image is also changed in the similar manner when another game player operates the operation device. In this way, while at least two dancers play dance on the screen, the time lag between the read-out timing in accordance with the external operation by the operation device, and the generation timing of the beat information generated by the beat information generating device on the basis of the music signal, is detected by the score calculating device, and the game score is calculated by the score calculating device on the basis of this detected time lag. Therefore, the game score becomes the higher as the timing at which the game player changes the dance performance by way of the operation device gets the closer to the timing of the beat of the dance music.

The above object of the present invention can be also achieved by a second video dance game apparatus for displaying an image of at least two dancers on a screen and controlling the dancers in the displayed image to play various dance performances in accordance with an external operation by a game player to thereby offer a dance game to the game player. The second video dance game apparatus is provided with: an image displaying device having the screen, for displaying the image of the dancers on the screen; a dance music output device for outputting a music signal indicating a dance music; a beat information generating device for generating beat information on the basis of the music signal; a dance performance data memory device for storing a plurality of dance performance data pieces each indicating respective one of the various dance performances; a dance performance data selecting and reading out device for selecting and reading out one of the dance performance data pieces stored in the dance performance data memory device; an image control device for controlling the image displaying device to change the image of the dancers such that the dancers play a dance performance corresponding to the read out dance performance data piece; an operation device by which the external operation is inputted, for operating the dance performance data selecting and reading out device in accordance with the external operation to select and read out the one of the dance performance data pieces for at least one of the dancers, so as to change the dance performance of the at least one of the dancers on the screen; a read-out control device for controlling the dance performance data selecting and reading out device to select and read out another of the dance performance data pieces for another of the dancers in a predetermined order and at a predetermined timing which are set in advance for the another of the dancers; and a score calculating device for calculating a game score on the basis of a time lag between a read-out timing, which is a timing at which the dance performance data piece is read out by the dance performance data selecting and reading out device in accordance with the external operation, and a generation timing of the beat information, which is a timing at which the beat information is generated by the beat information generating device.

According to the second video dance game apparatus, the image of at least two dancers is displayed on the screen by the image display device, while a music signal indicating a dance music is outputted by the dance music output device. In this condition, the game player operates the operation device, and inputs the external operation by the operation device in accordance with this dance music. Then, the dance performance data selecting and reading out device is operated, so that one of the dance performance data pieces stored in the dance performance data memory device is selected and read out by the dance performance data selecting and reading out device. Thus, under the control of the image control device, the dance performance of one of the dancers in the displayed image is changed in correspondence with the read dance performance data piece. On the other hand, when, under the control of the read-out control device, another of the dance performance data pieces for another of the dancers in the predetermined order and at the predetermined timing is selected and read out by the dance performance data selecting and reading out device, the dance performance of another of the dancers in the displayed image is also changed. In this way, while at least two dancers play dance on the screen, the time lag between the read-out timing in accordance with the external operation by the operation device, and the generation timing of the beat information generated by the beat information generating device on the basis of the music signal, is detected by the score calculating device, and the game score is calculated by the score calculating device on the basis of this detected time lag. Therefore, the game score becomes the higher as the timing at which the game player changes the dance performance by way of the operation device gets the closer to the timing of the beat of the dance music.

According to the above described first or second video dance game apparatus, while the game player can experience a virtual dance, the game player can compete for the musical sense and the artistic sense.

The above object of the present invention can be also achieved by a third video dance game apparatus for displaying an image of at least two dancers on a screen and controlling the dancers in the displayed image to play various dance performances in accordance with an external operation by a game player to thereby offer a dance game to the game player. The third video dance game apparatus is provided with: an image displaying device having the screen, for displaying the image of the dancers on the screen; a dance music output device for outputting a music signal indicating a dance music; a beat information generating device for generating beat information on the basis of the music signal; a dance performance data memory device for storing a plurality of dance performance data pieces each indicating respective one of the various dance performances; a dance performance data selecting and reading out device for selecting and reading out one of the dance performance data pieces stored in the dance performance data memory device; an image control device for controlling the image displaying device to change the image of the dancers such that the dancers play a dance performance corresponding to the read out dance performance data piece; an operation device by which the external operation is inputted, for operating the dance performance data selecting and reading out device in accordance with the external operation to select and read out the one of the dance performance data pieces, so as to change the dance performance of the dancers on the screen; a judging device for judging a mutual relation between the dancers in the displayed image; a dance performance data selection permitting device for permitting the dance performance data selecting and reading out device to select the one of the dance performance data pieces only from among the dance performance data pieces each indicating such a dance performance that movements of the dancers are interlocked with each other, in case that the judged mutual relation is a predetermined relation; and a score calculating device for calculating a game score on the basis of the read out dance performance data piece in correspondence with the external operation.

According to the third video dance game apparatus, the image of at least two dancers is displayed on the screen by the image display device, while a music signal indicating a dance music is outputted by the dance music output device. In this condition, the game player operates the operation device, such as button switches, drive levers, a keyboard, a mouse, a joy-stick or the like, and inputs the external operation by the operation device in accordance with this dance music. Then, the dance performance data selecting and reading out device is operated, so that one of the dance performance data pieces stored in the dance performance data memory device is selected and read out by the dance performance data selecting and reading out device. Thus, under the control of the image control device, the dance performance of one of the dancers in the displayed image is changed in correspondence with the read dance performance data piece. At this time, the dance performance of another of the dancers in the displayed image is also changed in the similar manner when another game player operates the operation device. In this way, while at least two dancers play dance on the screen, a mutual relation between the dancers in the displayed image is judged by the judging device. In case that the judged mutual relation is a predetermined relation, the dance performance data selecting and reading out device is permitted to select the one of the dance performance data pieces only from among the dance performance data pieces each indicating such a dance performance that movements of the dancers are interlocked with each other, by the dance performance data selection permitting device. Then, the game score is calculated by the score calculating device on the basis of the read out dance performance data piece, which is read out by this permitted dance performance data selecting and reading out device, in correspondence with the external operation. Therefore, the game score becomes the higher as the timing at which the game player changes a combined or pair dance performance for example, by way of the operation device while at least two dancers in the displayed image perform the combined or pair dance performance, gets the closer to the timing of the beat of the dance music.

The above object of the present invention can be also achieved by a fourth video dance game apparatus for displaying an image of at least two dancers on a screen and controlling the dancers in the displayed image to play various dance performances in accordance with an external operation by a game player to thereby offer a dance game to the game player. The fourth video dance game apparatus is provided with: an image displaying device having the screen, for displaying the image of the dancers on the screen; a dance music output device for outputting a music signal indicating a dance music; a beat information generating device for generating beat information on the basis of the music signal; a dance performance data memory device for storing a plurality of dance performance data pieces each indicating respective one of the various dance performances; a dance performance data selecting and reading out device for selecting and reading out one of the dance performance data pieces stored in the dance performance data memory device; an image control device for controlling the image displaying device to change the image of the dancers such that the dancers play a dance performance corresponding to the read out dance performance data piece; an operation device by which the external operation is inputted, for operating the dance performance data selecting and reading out device in accordance with the external operation to select and read out the one of the dance performance data pieces for at least one of the dancers, so as to change the dance performance of the at least one of the dancers on the screen; a read-out control device for controlling the dance performance data selecting and reading out device to select and read out another of the dance performance data pieces for another of the dancers in a predetermined order and at a predetermined timing which are set in advance for the another of the dancers; a judging device for judging a mutual relation between the dancers in the displayed image; a dance performance data selection permitting device for permitting the dance performance data selecting and reading out device to select the one of the dance performance data pieces only from among the dance performance data pieces each indicating such a dance performance that movements of the dancers are interlocked with each other, in case that the judged mutual relation is a predetermined relation; and a score calculating device for calculating a game score on the basis of the read out dance performance data piece in correspondence with the external operation.

According to the fourth video dance game apparatus, the image of at least two dancers is displayed on the screen by the image display device, while a music signal indicating a dance music is outputted by the dance music output device. In this condition, the game player operates the operation device, such as button switches, drive levers, a keyboard, a mouse, a joy-stick or the like, and inputs the external operation by the operation device in accordance with this dance music. Then, the dance performance data selecting and reading out device is operated, so that one of the dance performance data pieces stored in the dance performance data memory device is selected and read out by the dance performance data selecting and reading out device. Thus, under the control of the image control device, the dance performance of one of the dancers in the displayed image is changed in correspondence with the read dance performance data piece. On the other hand, when, under the control of the read-out control device, another of the dance performance data pieces for another of the dancers in the predetermined order and at the predetermined timing is selected and read out by the dance performance data selecting and reading out device, the dance performance of another of the dancers in the displayed image is also changed. In this way, while at least two dancers play dance on the screen, a mutual relation between the dancers in the displayed image is judged by the judging device. In case that the judged mutual relation is a predetermined relation, the dance performance data selecting and reading out device is permitted to select the one of the dance performance data pieces only from among the dance performance data pieces each indicating such a dance performance that movements of the dancers are interlocked with each other, by the dance performance data selection permitting device. Then, the game score is calculated by the score calculating device on the basis of the read out dance performance data piece, which is read out by this permitted dance performance data selecting and reading out device, in correspondence with the external operation.

According to the above described third or fourth video dance game apparatus, the game player can operate at least two dancers in the displayed image to play a combined or pair dance performance, and can enjoy a more realistic dance competition.

In one aspect of each of the first to fourth video dance game apparatuses of the present invention, the apparatus is further provided with: a time measuring device for measuring time and restricting a time period, during which the external operation is inputted by the operation device, to a predetermined time period; and a time adjusting device for adjusting the predetermined time period on the basis of the game score calculated by the score calculating device.

According to this aspect, the time period, during which the external operation is inputted by the operation device (i.e. the game time period) is restricted to a predetermined time period by the time measuring device. Since this predetermined time period is adjusted by the time adjusting device on the basis of the game score calculated by the score calculating device, as the game player gets the higher score, the longer game time period is given to the game player, for example. Accordingly, the game player can enjoy the longer game time period, and the point may be further added to the game score in such a case.

In another aspect of the first or second video dance game apparatus of the present invention, the score calculating device calculates the game score on the basis of at least one of a selection order of the dance performance data pieces in correspondence with the external operation, a mutual relation between the successively read dance performance data pieces, and a continuity between the successively read dance performance data pieces, in addition to the time lag.

According to this aspect, since the game score is calculated by the score calculating device on the basis of at least one of the selection order, the mutual relation and the continuity in addition to the time lag, the musical sense and/or the artistic sense as for the dance can be reflected onto the video dance game. Accordingly, the enjoyment of the video dance game can be promoted.

In this aspect, the apparatus may be further provided with: a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece; a basic movement level setting device for setting a basic movement level on the basis of at least one of the read-out timing, the selection order, the mutual relation and the continuity between the successively read dance performance data pieces; a basic movement data selecting and reading out device for selecting and reading out one of the basic movement data pieces in accordance with the basic movement level set by the basic movement level setting device; and a basic movement control device for controlling the image displaying device to change the image of the dancers such that the dancers perform the predetermined movement corresponding to the read out basic movement data piece, when the image of the dancers is not changed in correspondence with the read dance performance data piece.

In this case, when the dance performance data piece is read out, the basic movement level is set by the basic movement level setting device on the basis of at least one of the read-out timing, the selection order, the mutual relation and the continuity. Then, one of the basic movement data pieces stored in the basic movement data memory device is selected and read out by the basic movement data selecting and reading out device, in accordance with the basic movement level set by the basic movement level setting device. When the image of the dancers is not changed in correspondence with the read dance performance data piece, under the control of the basic movement control device, the image of the dancers is changed by the image displaying device such that the dancers perform the predetermined movement corresponding to the read out basic movement data piece. Therefore, even when the external operation is not inputted by the operation device, the image of the dancers is changed so as to perform the predetermined movement. Thus, the dance performance can be played in a manner similar to the real dance actions, and the musical sense and/or the artistic sense as for the dance can be reflected onto the predetermined movement of the dancers.

In this aspect also, the apparatus may be further provided with a dance music control device for controlling the dance music output device to change the music signal outputted therefrom in accordance with at least one of the read-out timing, the selection order, the mutual relation and the continuity between the successively read dance performance data pieces.

In this case, under the control of the dance music control device, the music signal outputted from the dance music output device is changed in accordance with at least one of the read-out timing, the selection order, the mutual relation and the continuity. Therefore, in case of the dance performance having a high musical sense or a high artistic sense as for the dance, if the external operation to play the dance performance excellent in the cooperation between the dancers is inputted by the game player, the dance music excited correspondingly can be outputted, so that the cooperative feeling between the dance and the music can be improved.

In another aspect of the third or fourth video dance game apparatus of the present invention, the judging device judges a mutual positional relation between the dancers in the displayed image, as the mutual relation. And that, the score calculating device calculates the game score on the basis of at least one of a read-out timing, which is a timing at which the dance performance data piece is read out by the dance performance data selecting and reading out device, the mutual positional relation, a selection order of the dance performance data pieces, a mutual relation between the successively read dance performance data pieces, and a continuity between the successively read dance performance data pieces, in correspondence with the external operation.

According to this aspect, the mutual positional relation between the dancers in the displayed image is judged as the mutual relation by the judging device. Then, the game score is calculated by the score calculating device on the basis of at least one of the read-out timing, the mutual positional relation, the selection order, the mutual relation and the continuity, in correspondence with the external operation. Therefore, not only the musical sense and/or the artistic sense as for the dance but also the cooperative sense can be even more reflected onto the video dance game.

In this aspect, the apparatus may be further provided with: a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece; a basic movement level setting device for setting a basic movement level on the basis of at least one of the read-out timing, the mutual positional relation, the selection order, the mutual relation and the continuity between the successively read dance performance data pieces; a basic movement data selecting and reading out device for selecting and reading out one of the basic movement data pieces in accordance with the basic movement level set by the basic movement level setting device; and a basic movement control device for controlling the image displaying device to change the image of the dancers such that the dancers perform the predetermined movement corresponding to the read out basic movement data piece, when the image of the dancers is not changed in correspondence with the read dance performance data piece.

In this case, when the dance performance data piece is read out, the basic movement level is set by the basic movement level setting device on the basis of at least one of the read-out timing, the mutual positional relation, the selection order, the mutual relation and the continuity. Then, one of the basic movement data pieces stored in the basic movement data memory device is selected and read out by the basic movement data selecting and reading out device, in accordance with the basic movement level set by the basic movement level setting device. When the image of the dancers is not changed in correspondence with the read dance performance data piece, under the control of the basic movement control device, the image of the dancers is changed by the image displaying device such that the dancers perform the predetermined movement corresponding to the read out basic movement data piece. Therefore, even when the external operation is not inputted by the operation device, the image of the dancers is changed so as to perform the predetermined movement. Thus, the dance performance can be played in a manner similar to the real dance actions, and the musical sense and/or the artistic sense as for the dance can be reflected onto the predetermined movement of the dancers.

In this aspect also, the apparatus may be further provided with a dance music control device for controlling the dance music output device to change the music signal outputted therefrom in accordance with at least one of the read-out timing, the mutual positional relation, the selection order, the mutual relation and the continuity between the successively read dance performance data pieces.

In this case, under the control of the dance music control device, the music signal outputted from the dance music output device is changed in accordance with at least one of the read-out timing, the mutual positional relation, the selection order, the mutual relation and the continuity.

Therefore, in case of the dance performance having a high musical sense or a high artistic sense as for the dance, if the external operation to play the dance performance excellent in the cooperation between the dancers is inputted by the game player, the dance music excited correspondingly can be outputted, so that the cooperative feeling between the dance and the music can be improved.

In another aspect of the first or second video dance game apparatus of the present invention, the apparatus is further provided with a dance music control device for controlling the dance music output device to change the music signal outputted therefrom in accordance with the read-out timing and the generation timing.

According to this aspect, under the control of the dance music control device, the music signal outputted from the dance music output device is changed in accordance with the read-out timing and the generation timing. Therefore, in case that the external operation to obtain a high game score is inputted by the game player, the dance music excited correspondingly can be outputted, so that the cooperative feeling between the dance and the music can be improved.

In another aspect of the third or fourth video dance game apparatus of the present invention, theapparatus is further provided with a dance music control device for controlling the dance music output device to change the music signal outputted therefrom in accordance with the read dance performance data piece.

According to this aspect, under the control of the dance music control device, the music signal outputted from the dance music output device is changed in accordance with the read dance performance data piece. Therefore, in case that the external operation for the combined or pair dance performance to obtain a high game score is inputted by the game player, the dance music excited correspondingly can be outputted, so that the cooperative feeling between the dance and the music can be improved.

In another aspect of the first or second video dance game apparatus of the present invention, the apparatus is further provided with: a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece; a basic movement level setting device for setting a basic movement level on the basis of the time lag between the read-out timing and the generation timing; a basic movement data selecting and reading out device for selecting and reading out one of the basic movement data pieces in accordance with the basic movement level set by the basic movement level setting device; and a basic movement control device for controlling the image displaying device to change the image of the dancers such that the dancers perform the predetermined movement corresponding to the read out basic movement data piece, when the image of the dancers is not changed in correspondence with the read dance performance data piece.

According to this aspect, when the dance performance data piece is read out, the basic movement level is set by the basic movement level setting device on the basis of the time lag between the read-out timing and the generation timing. Then, one of the basic movement data pieces stored in the basic movement data memory device is selected and read out by the basic movement data selecting and reading out device, in accordance with the basic movement level set by the basic movement level setting device. When the image of the dancers is not changed in correspondence with the read dance performance data piece, under the control of the basic movement control device, the image of the dancers is changed by the image displaying device such that the dancers perform the predetermined movement corresponding to the read out basic movement data piece. Therefore, even when the external operation is not inputted by the operation device, the image of the dancers is changed so as to perform the predetermined movement. Thus, the dance performance can be played in a manner similar to the real dance actions. Further, by setting the basic movement level to the higher level as the external operation to obtained the higher game score is inputted, the predetermined movement after the dance performance based on the external operation becomes the higher performance. Accordingly, the video dance game can be even more improved.

In another aspect of the third or fourth video dance game apparatus of the present invention, the apparatus is further provided with: a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece; a basic movement level setting device for setting a basic movement level on the basis of the read dance performance data piece; a basic movement data selecting and reading out device for selecting and reading out one of the basic movement data pieces in accordance with the basic movement level set by the basic movement level setting device; and a basic movement control device for controlling the image displaying device to change the image of the dancers such that the dancers perform the predetermined movement corresponding to the read out basic movement data piece, when the image of the dancers is not changed in correspondence with the read dance performance data piece.

According to this aspect, when the dance performance data piece is read out, the basic movement level is set by the basic movement level setting device on the basis of the read dance performance data piece. Then, one of the basic movement data pieces stored in the basic movement data memory device is selected and read out by the basic movement data selecting and reading out device, in accordance with the basic movement level set by the basic movement level setting device. When the image of the dancers is not changed in correspondence with the read dance performance data piece, under the control of the basic movement control device, the image of the dancers is changed by the image displaying device such that the dancers perform the predetermined movement corresponding to the read out basic movement data piece. Therefore, even when the external operation is not inputted by the operation device, the image of the dancers is changed so as to perform the predetermined movement. After the external operation for the combined or pair dance performance is inputted and the combined or pair dance performance is played in the displayed image, the dancers in the combined or pair state performs the predetermined movement, so that the dance performance can be played in a manner similar to the real dance actions. Further, by setting the basic movement level to the higher level as the external operation to obtained the higher game score is inputted, the predetermined movement after the dance performance based on the external operation becomes the higher performance. Accordingly, the video dance game can be even more improved.

In the above mentioned aspects of the first to fourth video dance game apparatuses in which the apparatus is provided with: the basic movement data memory device; the basic movement level setting device; the basic movement data selecting and reading out device; and the basic movement control device, of the present invention, the dance performance data memory device may store a plurality of dance performance data pieces indicating dance performances which movements are different from each other with respect to one kind of dance performance. And that, the dance performance data selecting and reading out device may select and read out one of the dance performance data pieces stored in the dance performance data memory device in accordance with the basic movement level.

According to this aspect, a plurality of dance performance data pieces indicating dance performances which movements are different from each other with respect to one kind of dance performance, are stored in the dance performance data memory device. In operation, one of the dance performance data pieces stored in the dance performance data memory device is selected and read out by the dance performance data selecting and reading out device, in accordance with the basic movement level. Therefore, as the basic movement level is the higher, the dance performance data piece for the dance performance in the higher degree of movement with respect to the same kind of dance performance is selected. Thus, in case that the external operation to obtain a high game score is inputted, not only the predetermined movement when the external operation is not inputted but also the dance performance itself based on the external operation becomes the higher. Therefore, the musical sense and/or the artistic sense as for the dance can be even more reflected onto the video dance game.

Also in the above mentioned aspects of the first to fourth video dance game apparatuses in which the apparatus is provided with: the basic movement data memory device; the basic movement level setting device; the basic movement data selecting and reading out device; and the basic movement control device, of the present invention, the apparatus may be further provided with a dance music control device for controlling the dance music output device to change the music signal outputted therefrom in accordance with the basic movement level.

According to this aspect, under the dance music control device, the music signal outputted from the dance music output device is changed in accordance with the basic movement level. Therefore, in case that the external operation to obtain a high game score is inputted by the game player, not only the predetermined movement when the external operation is not inputted becomes excited, but also the outputted dance music becomes excited correspondingly, so that the cooperative feeling between the dance and the music can be improved.

The above object of the present invention can be also achieved by a first program storage device readable by a computer for a video dance game, tangibly embodying a program of instructions executable by the computer to perform method processes for displaying an image of at least two dancers on a screen and controlling the dancers in the displayed image to play various dance performances in accordance with an external operation by a game player to thereby offer a dance game to the game player, the program storage device storing a plurality of dance performance data pieces each indicating respective one of the various dance performances, the computer having an operation device by which the external operation is inputted. The method processes are provided with: displaying the image of the dancers on the screen; outputting a music signal indicating a dance music; generating beat information on the basis of the music signal; selecting and reading out one of the dance performance data pieces stored in the program storage device, in accordance with the external operation when the external operation is inputted by the operation device so as to change the dance performance of the dancers on the screen; changing the image of the dancers on the screen such that the dancers play a dance performance corresponding to the read out dance performance data piece; and calculating a game score on the basis of a time lag between a read-out timing, which is a timing at which the dance performance data piece is read out in accordance with the external operation, and a generation timing of the beat information, which is a timing at which the beat information is generated.

According to the first program storage device, such as a CD-ROM, a DVD-ROM, a ROM, a floppy disk or the like, of the present invention, the above described first video dance game apparatus of the present invention can be realized as the computer for the video dance game reads the dance performance data pieces and the program of instructions from the first program storage device, and executes the read program by use of the read dance performance data pieces.

The above object of the present invention can be also achieved by a second program storage device readable by a computer for a video dance game, tangibly embodying a program of instructions executable by the computer to perform method processes for displaying an image of at least two dancers on a screen and controlling the dancers in the displayed image to play various dance performances in accordance with an external operation by a game player to thereby offer a dance game to the game player, the program storage device storing a plurality of dance performance data pieces each indicating respective one of the various dance performances, the computer having an operation device by which the external operation is inputted. The method processes are provided with: displaying the image of the dancers on the screen; outputting a music signal indicating a dance music; generating beat information on the basis of the music signal; selecting and reading out one of the dance performance data pieces for at least one of the dancers stored in the program storage device, in accordance with the external operation when the external operation is inputted by the operation device so as to change the dance performance of the at least one of the dancers on the screen; selecting and reading out another of the dance performance data pieces for another of the dancers in a predetermined order and at a predetermined timing which are set in advance for the another of the dancers; changing the image of the dancers on the screen such that the dancers play a dance performance corresponding to the read out dance performance data piece; and calculating a game score on the basis of a time lag between a read-out timing, which is a timing at which the dance performance data piece is read out in accordance with the external operation, and a generation timing of the beat information, which is a timing at which the beat information is generated.

According to the second program storage device, such as a CD-ROM, a DVD-RON, a ROM, a floppy disk or the like, of the present invention, the above described second video dance game apparatus of the present invention can be realized as the computer for the video dance game reads the dance performance data pieces and the program of instructions from the second program storage device, and executes the read program by use of the read dance performance data pieces.

The above object of the present invention can be also achieved by a third program storage device readable by a computer for a video dance game, tangibly embodying a program of instructions executable by the computer to perform method processes for displaying an image of at least two dancers on a screen and controlling the dancers in the displayed image to play various dance performances in accordance with an external operation by a game player to thereby offer a dance game to the game player, the program storage device storing a plurality of dance performance data pieces each indicating respective one of the various dance performances, the computer having an operation device by which the external operation is inputted. The method processes are provided with: displaying the image of the dancers on the screen; outputting a music signal indicating a dance music; generating beat information on the basis of the music signal; selecting and reading out one of the dance performance data pieces stored in the program storage device, in accordance with the external operation when the external operation is inputted by the operation device so as to change the dance performance of the dancers on the screen; changing the image of the dancers on the screen such that the dancers play a dance performance corresponding to the read out dance performance data piece; judging a mutual relation between the dancers in the displayed image; permitting the selecting and reading out process to select the one of the dance performance data pieces only from among the dance performance data pieces each indicating such a dance performance that movements of the dancers are interlocked with each other, in case that the judged mutual relation is a predetermined relation; and calculating a game score on the basis of the read out dance performance data piece in correspondence with the external operation.

According to the third program storage device, such as a CD-ROM, a DVD-ROM, a ROM, a floppy disk or the like, of the present invention, the above described third video dance game apparatus of the present invention can be realized as the computer for the video dance game reads the dance performance data pieces and the program of instructions from the third program storage device, and executes the read program by use of the read dance performance data pieces.

The above object of the present invention can be also achieved by a fourth program storage device readable by a computer for a video dance game, tangibly embodying a program of instructions executable by the computer to perform method processes for displaying an image of at least two dancers on a screen and controlling the dancers in the displayed image to play various dance performances in accordance with an external operation by a game player to thereby offer a dance game to the game player, the program storage device storing a plurality of dance performance data pieces each indicating respective one of the various dance performances, the computer having an operation device by which the external operation is inputted. The method processes are provided with: displaying the image of the dancers on the screen; outputting a music signal indicating a dance music; generating beat information on the basis of the music signal; selecting and reading out one of the dance performance data pieces for at least one of the dancers stored in the program storage device, in accordance with the external operation when the external operation is inputted by the operation device so as to change the dance performance of the at least one of the dancers on the screen; selecting and reading out another of the dance performance data pieces for another of the dancers in a predetermined order and at a predetermined timing which are set in advance for the another of the dancers; changing the image of the dancers on the screen such that the dancers play a dance performance corresponding to the read out dance performance data piece; judging a mutual relation between the dancers in the displayed image; permitting the selecting and reading out process to select the one of the dance performance data pieces only from among the dance performance data pieces each indicating such a dance performance that movements of the dancers are interlocked with each other, in case that the judged mutual relation is a predetermined relation; and calculating a game score on the basis of the read out dance performance data piece in correspondence with the external operation.

According to the fourth program storage device, such as a CD-ROM, a DVD-ROM, a ROM, a floppy disk or the like, of the present invention, the above described fourth video dance game apparatus of the present invention can be realized as the computer for the video dance game reads the dance performance data pieces and the program of instructions from the fourth program storage device, and executes the read program by use of the read dance performance data pieces.

In one aspect of each of the first to fourth program storage devices of the present invention, the method processes are further provided with: measuring time and restricting a time period, during which the external operation is inputted by the operation device, to a predetermined time period; and adjusting the predetermined time period on the basis of the game score calculated by the score calculating process.

In another aspect of the first or second program storage device of the present invention, the score calculating process calculates the game score on the basis of at least one of a selection order of the dance performance data pieces in correspondence with the external operation, a mutual relation between the successively read dance performance data pieces, and a continuity between the successively read dance performance data pieces, in addition to the time lag.

In this aspect, the program storage device may further store a plurality of basic movement data pieces to change the image in various manners respectively such that the dancers perform a predetermined movement in accordance with the outputted dance music when the image of the dancers is not changed in correspondence with the read dance performance data piece. And that, the method processes may be further provided with: setting a basic movement level on the basis of at least one of the read-out timing, the selection order, the mutual relation and the continuity between the successively read dance performance data pieces; selecting and reading out one of the basic movement data pieces in accordance with the basic movement level set by the basic movement level setting process; and changing the image of the dancers on the display such that the dancers perform the predetermined movement corresponding to the read out basic movement data piece, when the image of the dancers is not changed in correspondence with the read dance performance data piece.

In this aspect also, the method processes may be further provided with changing the music signal outputted from the computer in accordance with at least one of the read-out timing, the selection order, the mutual relation and the continuity between the successively read dance performance data pieces.

In another aspect of the third or fourth program storage device of the present invention, the judging process judges a mutual positional relation between the dancers in the displayed image, as the mutual relation. And that, the score calculating process calculates the game score on the basis of at least one of a read-out timing, which is a timing at which the dance performance data piece is read out by the selecting and reading out process, the mutual positional relation, a selection order of the dance performance data pieces, a mutual relation between the successively read dance performance data pieces, and a continuity between the successively read dance performance data pieces, in correspondence with the external operation.

In this aspect, the program storage device may further store a plurality of basic movement data pieces to change the image in various manners respectively such that the dancers perform a predetermined movement in accordance with the outputted dance music when the image of the dancers is not changed in correspondence with the read dance performance data piece. And that, the method processes may be further provided with: setting a basic movement level on the basis of at least one of the read-out timing, the mutual positional relation, the selection order, the mutual relation and the continuity between the successively read dance performance data pieces; selecting and reading out one of the basic movement data pieces in accordance with the basic movement level set by the basic movement level setting process; and changing the image of the dancers on the screen such that the dancers perform the predetermined movement corresponding to the read out basic movement data piece, when the image of the dancers is not changed in correspondence with the read dance performance data piece.

In this aspect also, the method processes may be further provided with changing the music signal outputted from the computer in accordance with at least one of the read-out timing, the mutual positional relation, the selection order, the mutual relation and the continuity between the successively read dance performance data pieces.

In another aspect of the first or second program storage device of the present invention, the method processes are further provided with changing the music signal outputted from the computer in accordance with the read-out timing and the generation timing.

In another aspect of the third or fourth program storage device of the present invention, the method processes are further provided with changing the music signal outputted from the computer in accordance with the read dance performance data piece.

In another aspect of the first or second program storage device of the present invention, the program storage device further stores a plurality of basic movement data pieces to change the image in various manners respectively such that the dancers perform a predetermined movement in accordance with the outputted dance music when the image of the dancers is not changed in correspondence with the read dance performance data piece. And that, the method processes are further provided with: setting a basic movement level on the basis of the time lag between the read-out timing and the generation timing; selecting and reading out one of the basic movement data pieces in accordance with the basic movement level set by the basic movement level setting process; and changing the image of the dancers on the screen such that the dancers perform the predetermined movement corresponding to the read out basic movement data piece, when the image of the dancers is not changed in correspondence with the read dance performance data piece.

In another aspect of the third or fourth program storage device of the present invention, the program storage device further stores a plurality of basic movement data pieces to change the image in various manners respectively such that the dancers perform a predetermined movement in accordance with the outputted dance music when the image of the dancers is not changed in correspondence with the read dance performance data piece. And that, the method processes are further provided with: setting a basic movement level on the basis of the read dance performance data piece; selecting and reading out one of the basic movement data pieces in accordance with the basic movement level set by the basic movement level setting process; and changing the image of the dancers on the screen such that the dancers perform the predetermined movement corresponding to the read out basic movement data piece, when the image of the dancers is not changed in correspondence with the read dance performance data piece.

In the above mentioned aspects of the first to fourth program storage devices in which the program storage device further stores the basic movement data pieces, and the method processes are provided with: the basic movement level setting device; the basic movement data selecting and reading out device; and the basic movement control device, of the present invention, the program storage device may store a plurality of dance performance data pieces indicating dance performances which movements are different from each other with respect to one kind of dance performance. And that, the selecting and reading out process may select and read out one of the dance performance data pieces stored in the program storage device in accordance with the basic movement level.

Also in the above mentioned aspects of the first to fourth program storage devices in which the program storage device further stores the basic movement data pieces, and the method processes are provided with: the basic movement level setting device; the basic movement data selecting and reading out device; and the basic movement control device, of the present invention, the method processes may be further provided with changing the music signal outputted from the computer in accordance with the basic movement level.

According to each of the above described aspects of the first to fourth program storage devices of the present invention, respective one of the aspects of the above described first to fourth video dance game apparatus of the present invention can be realized.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Embodiments of the present invention will be now explained, with referring to the accompanying drawings.

[First Embodiment]

Figure 1:
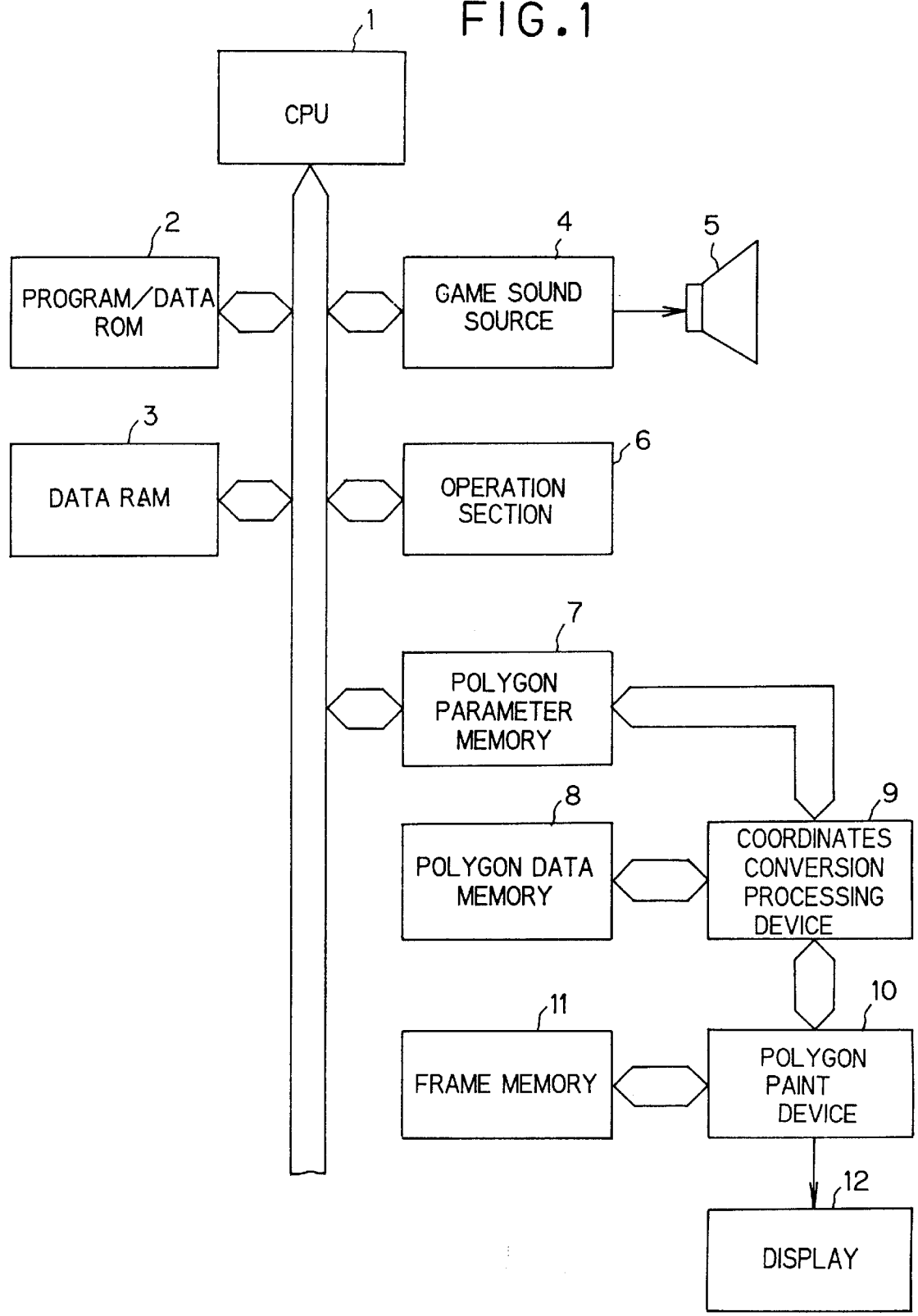
FIG. 1 is a block diagram of a video dance game apparatus as a first embodiment of the present invention.

At first, a first embodiment is explained with reference to FIGS. 1 to 6. FIG. 1 is a block diagram showing a schematic configuration of a video game apparatus of this embodiment.

In FIG. 1, the video game apparatus is provided with: a CPU (Central Processing Unit) 1, a program/data ROM (Read Only Memory) 2; a data RAM (Random Access Memory) 3; a game sound source 4; a speaker 5; an operation section 6; a polygon parameter memory 7; a polygon data memory 8; a coordinates conversion processing device 9; a polygon paint device 10; a frame memory 11; and a display device 12.

The program/data ROM 2 and the data RAM 3 are connected to the CPU 1 through a communication bus. The CPU 1 runs a program of a game stored in the program/data ROM 2 as one example a program storage device on the basis of the data stored in the data RAM 3. Moreover, the CPU 1 performs calculations such as a coordinates conversion and the like, as described later.

A dance music signal including a beat signal data is outputted from the game sound source 4 as one example of the dance music output device. The game sound source 4 may include a reproducing device such as a CD player, a DVD player or the like to reproduce a music sound from an information record medium such as a CD, a DVD or the like. This beat signal data is inputted to the CPU 1. The CPU 1 detects a timing at an on-beat, on the basis of this beat signal data, and then compares this timing at the on-beat with a timing of a played performance to thereby calculate a score. That is, the CPU 1 functions as one example of the beat information generating device and also one example of the score calculating device.

Figure 2:
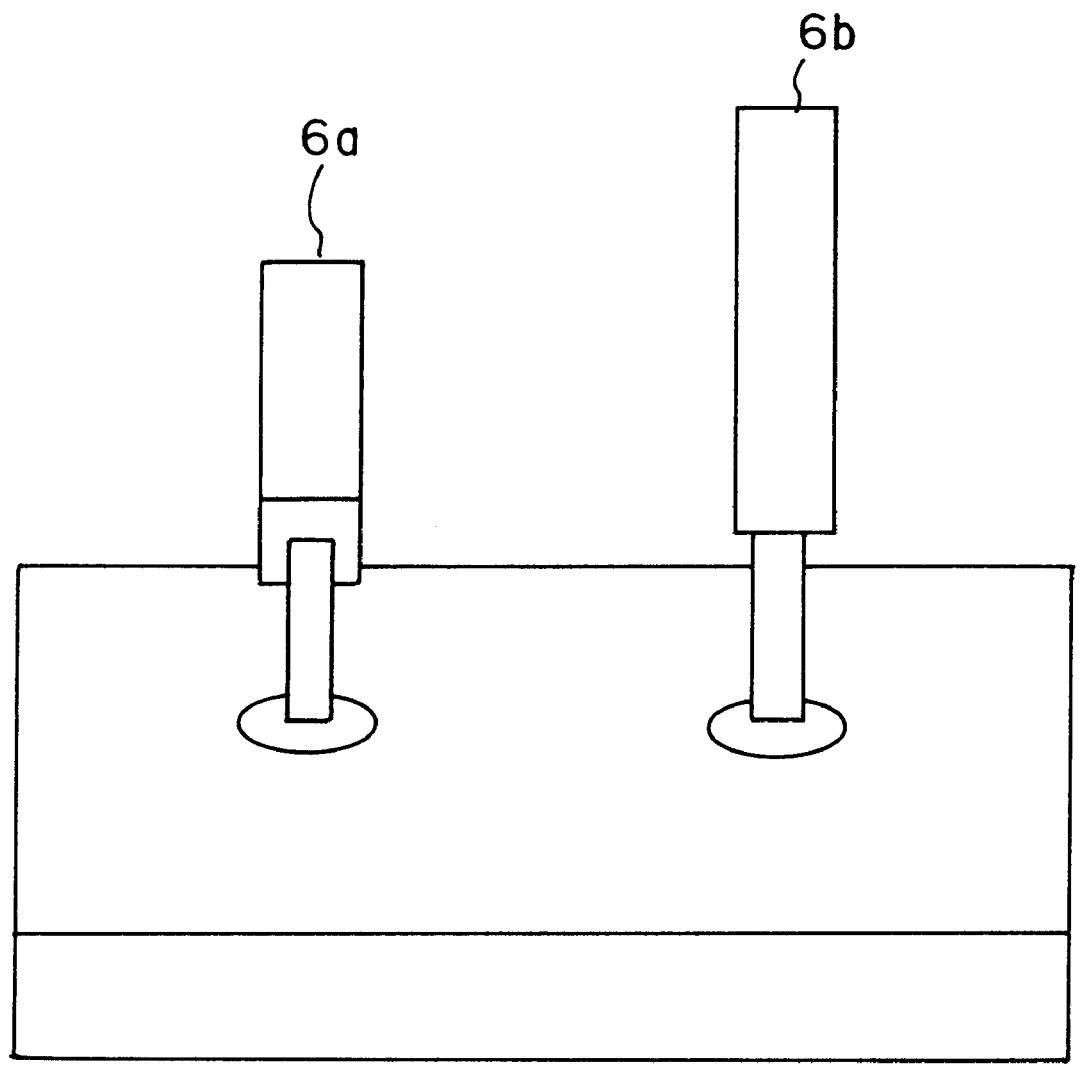
FIG. 2 is a perspective view of one example of an operation section in the video dance game apparatus of FIG. 1.

The operation section 6 as one example of the operation device is provided with a plurality of normal push buttons and/or cross-arranged push buttons disposed on an operation panel of the video game apparatus to thereby set a kind of a performance based on a selection of a pressed push button and a pressed order. Moreover, not only the above mentioned buttons, but also two drive levers 6a and 6b, which can be moved respectively forward and backward as shown in FIG. 2, may be employed, so that the kind of the performance may be set on the basis of the moved direction and the moved amount of the drive levers 6a and 6b. For example, the left drive lever 6a is set so as to operate a left half body of a dancer on a screen of the display device 12, and the right drive lever 6b is set so as to operate a right half body of the dancer on the screen. Then, it is possible to respectively throw down onto this side and a forward side to thereby let the dancer perform a movement on the screen as shown in a TABLE 1. In the TABLE 1, a reference mark "L" denotes the left drive lever 6a, "R" denotes the right drive lever 6b, "↑" denotes an operation that the drive lever 6a or 6b is thrown down onto the forward side, and "↓" denotes an operation that the drive lever 6a or 6b is thrown down onto this side.

TABLE 1

| Lever Direction | Movement From Standing Position |
|---|---|
| L ↑ R ↑ | Apply Force Forward |
| L ↓ R ↓ | Apply Force Backward |
| L ↑ R ↑ L ↓ R ↓ | Suddenly Move Weight Backward |
| L ↓ R ↓ L ↑ R ↑ | Suddenly Move Weight Forward |
| L ↑ R ↓ | Right Pivot |
| L ↓ R ↑ L ↑ R ↓ | Right Turn |
| L ↓ R ↑ | Left Pivot |
| L ↑ R ↓ L ↓ R ↑ | Left Turn |

In this embodiment, in order to give more reality to the dancer's movement, the dancer, the background and the like are represented by three-dimensional coordinates in the form of a polyhedron, which is a set of polygonal planes. Values of the coordinates in the three-dimensional coordinates frame at each of the vertexes of the polygonal planes are converted into coordinates of a display element having a two-dimensional display plane on the screen of the display device 12. This conversion is carried out for each polygonal plane, and is then displayed on the screen.

Such a polygonal plane is referred to as a "polygon". In this embodiment, the value of the coordinates at each vertex of the polygon of the dancer and the background are stored in the polygon data memory 8 as the polygon data, and are used as fixed physical information within a three-dimensional space.

Position information with respect to two dancers, color information and a coordinates conversion equation related to the position information are stored in the polygon parameter memory 7.

A coordinates conversion processing device 9 as one example of the image control device reads a content stored in the polygon parameter memory 7 to thereby perform a coordinates conversion process for the polygon data, and further performs a coordinates conversion process so as to project the coordinates-converted polygon data in the three-dimensional coordinates frame onto the screen. The polygon paint device 10 as one example of the image displaying device reads a light source parameter from the polygon data memory 8, performs the coloring process and the like for the coordinates-converted polygon data, writes the polygon data to the frame memory 11, and then reads it out after writing all the polygon data to thereby output it to the display device 12.

The data is written to the frame memory 11 in order to determine the order of drawing in consideration with a distance of a deep direction on the screen. That is, it is necessary to register each polygon data in the memory, sort them at a time of drawing, read out in the order of decreasing a length in the deep direction on the screen and then draw them in the frame memory 11.

In the above mentioned configuration, when a game player operates the operation section 6 provided with the drive levers 6a and 6b (in FIG. 2) and the like to thereby change a pose and a position of the dancer, the CPU 1 as one example of the dance performance data selecting and reading out device selects and reads out the position of the dancer and the coordinates conversion equation with regard thereto as the dance performance data, from the program/ data ROM 2 as one example of the dance performance data memory device, and momentarily stores the read out position of the dancer and the coordinates conversion equation with regard thereto, into the polygon parameter memory 7. Then, the coordinates conversion processing device 9 reads out the fixed physical information stored in the polygon data memory 8 and the dancer's position and the coordinates conversion equation stored in the polygon parameter memory 7, and then coordinates-converts the fixed physical information, such as the background and the like, with respect to a relatively observing point for the dancer at that time, and further performs the coordinates conversion process so as to project the coordinates-converted polygon data in the three-dimensional coordinates frame onto the screen. The writing operation to the frame memory 11 is carried out by sending the thus-obtained information to the polygon paint device 10. Hence, by reading it out, the substantially three-dimensional image is depicted on the screen of the display device 12.

Figure 3:
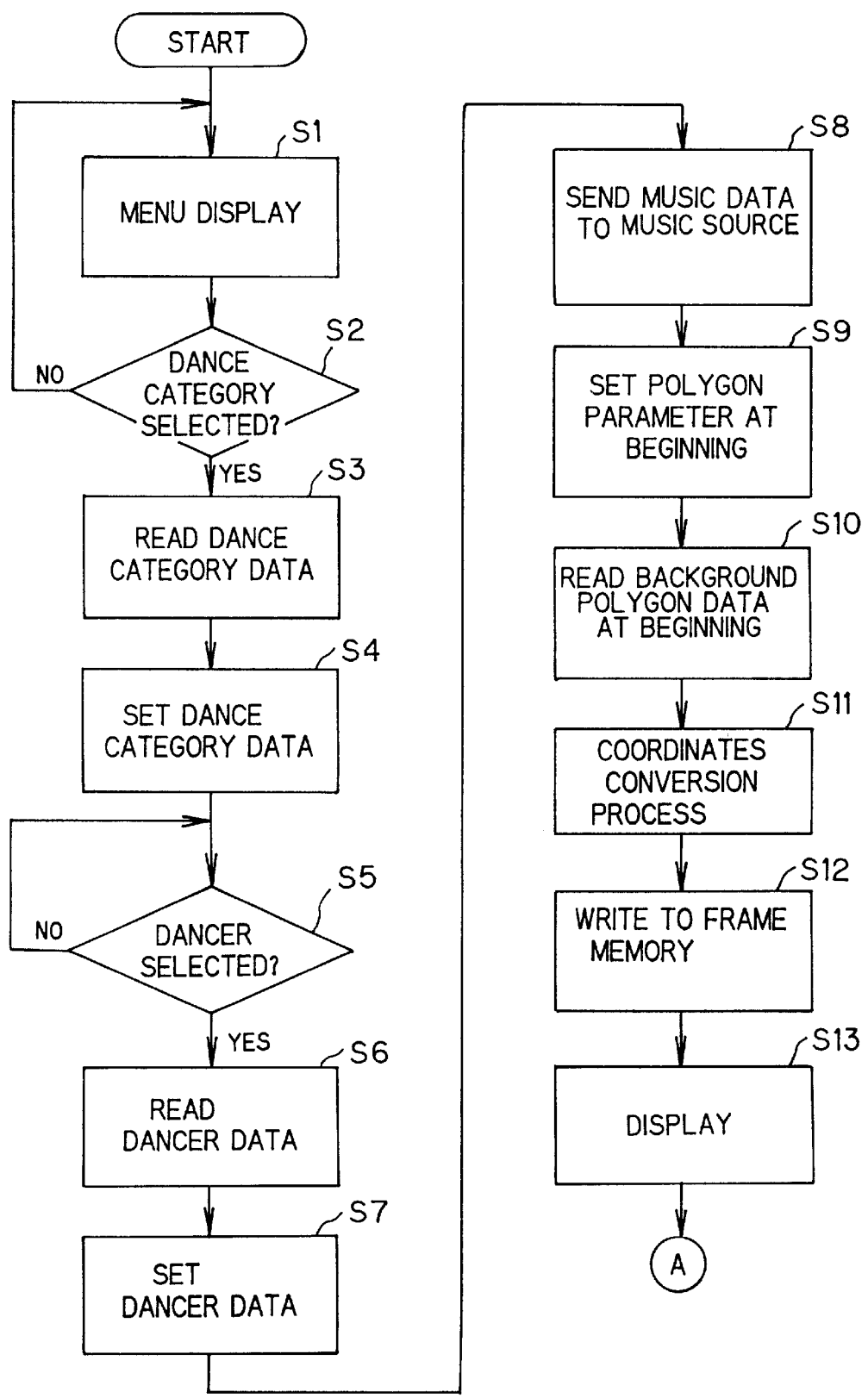
FIG. 3 is a flowchart showing one portion of an operation of the first embodiment.

Next, an operation of the video dance game apparatus of this embodiment having the above mentioned configuration is explained with reference to flowcharts in FIGS. 3 to 6. As shown in the flowchart of FIG. 3, a menu screen is displayed at first (Step S1). Then, a category (genre) of a dance to be competed is selected (Step S2). Each dance is classified on the basis of a kind of a beat signal. When a dance is selected, the selected dance category data is read from the ROM 2 (Step S3), and this is set and stored into the RAM 3 (Step S4). Next, a dancer is selected (Step S5). For each dancer, the level data of a plurality of body feature items is set for each of a personal performance and a combination performance. A score is calculated when the performance is played in accordance with the level data for each of the body feature items.

For example, a level indicating a heavy weight as for a body weight item among the body feature items is set for a dancer A. Thus, if the game player operates so as to play a performance of a jump, a score becomes low. The dancer A is set so as not to take an excessive jump also on the screen. Moreover, a level indicating an excellently speed feeling as for a speed feeling item among the body feature items is set for a dancer B. Thus, if the game player operates so as to consecutively play the performance, the score becomes high.

Then, in a case that any one of the dancers is selected, the selected dancer data is read from the program/data ROM 2 (Step S6), and is set and stored into the data RAM 3 (Step S7).

Next, music data based on the selected dance category data is sent to the game sound source 4 (Step S8), and the dance music is reproduced. A beat signal is also included in the music data. The polygon data with regard to the dancer at the beginning of the game is set in the polygon parameter memory 7 (Step S9). The polygon data with regard to the background at the beginning of the game is read from the polygon data memory 8 (Step S10). Then, the coordinates conversion process is performed by the coordinates conversion processing device 9 (Step S11). The converted polygon data is written into the frame memory 11 by the polygon paint device 10 (Step S12), and is displayed on the display device 12 (Step S13).

Figure 4:
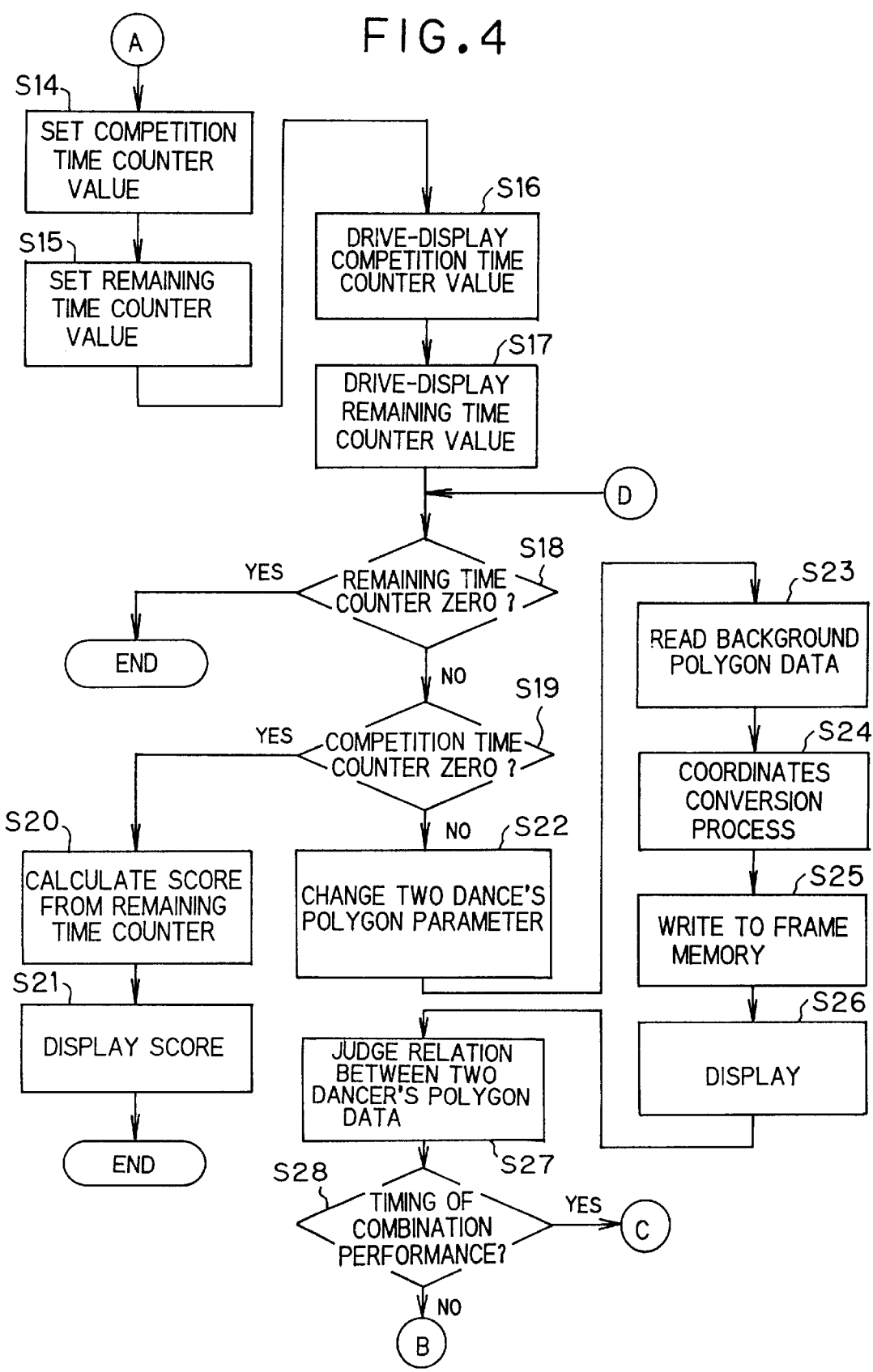
FIG. 4 is a flowchart showing another portion of the operation of the first embodiment.

Next, as shown in the flowchart of FIG. 4, a competition time counter as one example of the time measuring device is set to a predetermined value (for example, 5 minutes) (Step S14). A remaining time counter is set to a predetermined value (for example, 1 minute) (Step S15). The competition time is a time period during which the dance music is reproduced, and is set in the dance category data. The remaining time is a time period during which the game player can operate the dancer, and is set in such a way that the competition time is longer than the remaining time at the beginning of the game. As described later, since the game player plays the performance for the dancer, a time corresponding to the score is added to the remaining time by the CPU 1 as one example of the time adjusting device, and thereby a time period during which the dancer can be operated is extended. On the other hand, when the dance music is finished because of an expiration of the competition time, the remaining time at that time is converted into the score and is then displayed. Then the remaining time is expired while the dance music is reproduced, the game is finished.

In order to execute the above mentioned process, the competition time counter is firstly down-count-driven and the result is displayed (Step S16). The remaining time counter is down-count-driven and the result is displayed (Step S17). Next, it is judged whether or not the remaining time counter is zero (Step S18). If it is zero (Step S18: YES), the game is finished. If it is not zero (Step S18: NO), it is judged whether or not the dance is finished when the competition time counter is zero (Step S19). If it is finished (Step S19: YES), the conversion of the remaining time into the score is carried out from the remaining time counter at that time (Step S20), and this is displayed (Step S21).

If it is not zero (Step S19: NO), the polygon parameter data for the two dancers is changed on the basis of the dance music data, and the changed data is set in the polygon parameter memory 7 (Step S22). The polygon data with regard to the background at that time is read from the polygon data memory 8 (Step S23), and the coordinates conversion process is performed (Step S24). Then, the converted polygon data is written into the frame memory by the polygon paint device 10 (Step S25), and is displayed on the display device 12 (Step S26). That is, such a display that an appropriate dance is performed by moving the image of the two dancers is carried out by the processes at the steps S22 to S26.

Then, the CPU 1 as one example of the position judging device detects a position, a distance and the like in the polygon data of the two dancers, so as to judge the relation between the polygon data of one dancer and the polygon data of the other dancer (Step S27). Then, the CPU 1 judges whether or not it is a timing at which the combination performance can be played (Step S28).

Figure 5:
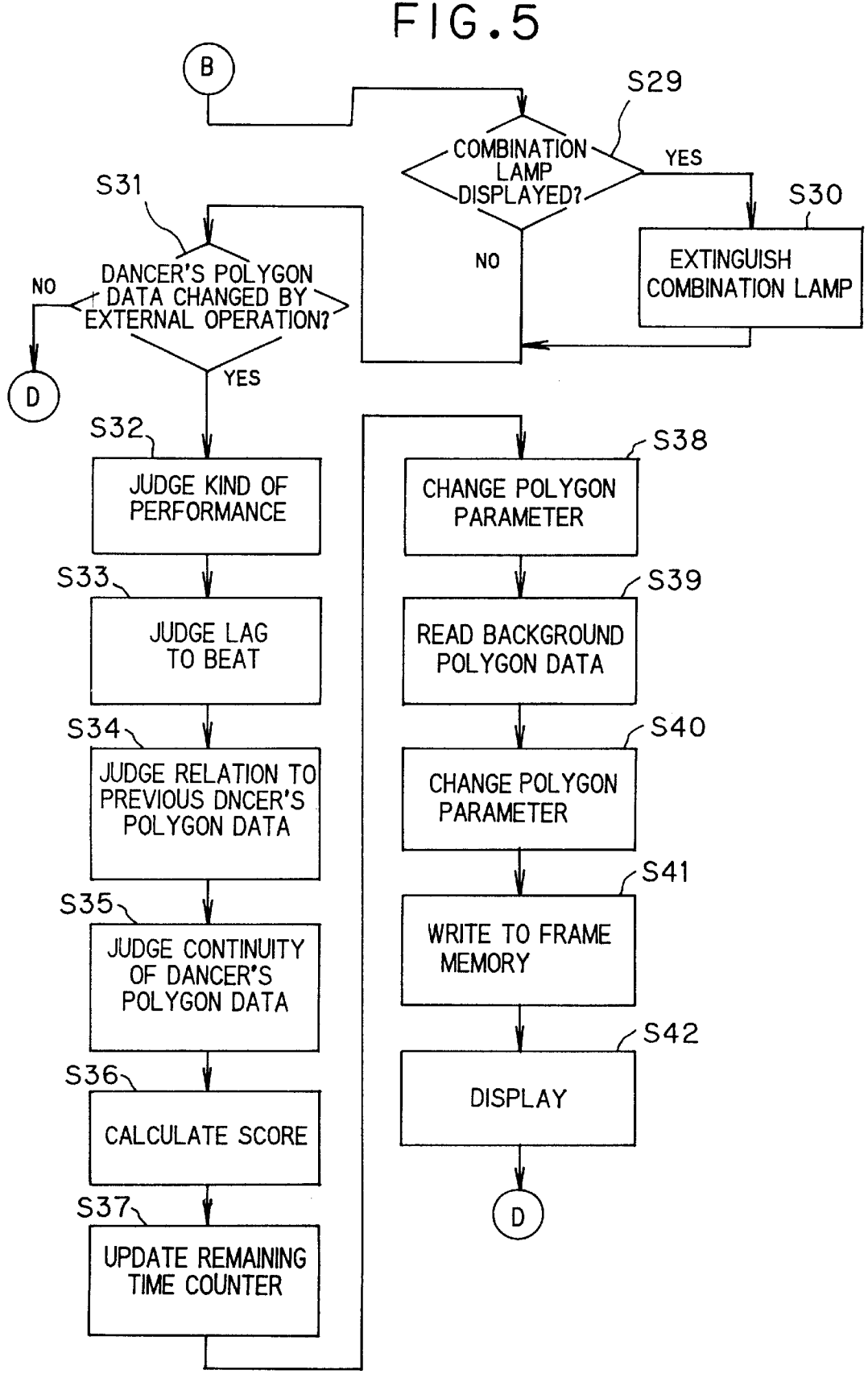
FIG. 5 is a flowchart showing another portion of the operation of the first embodiment.
Figure 6:
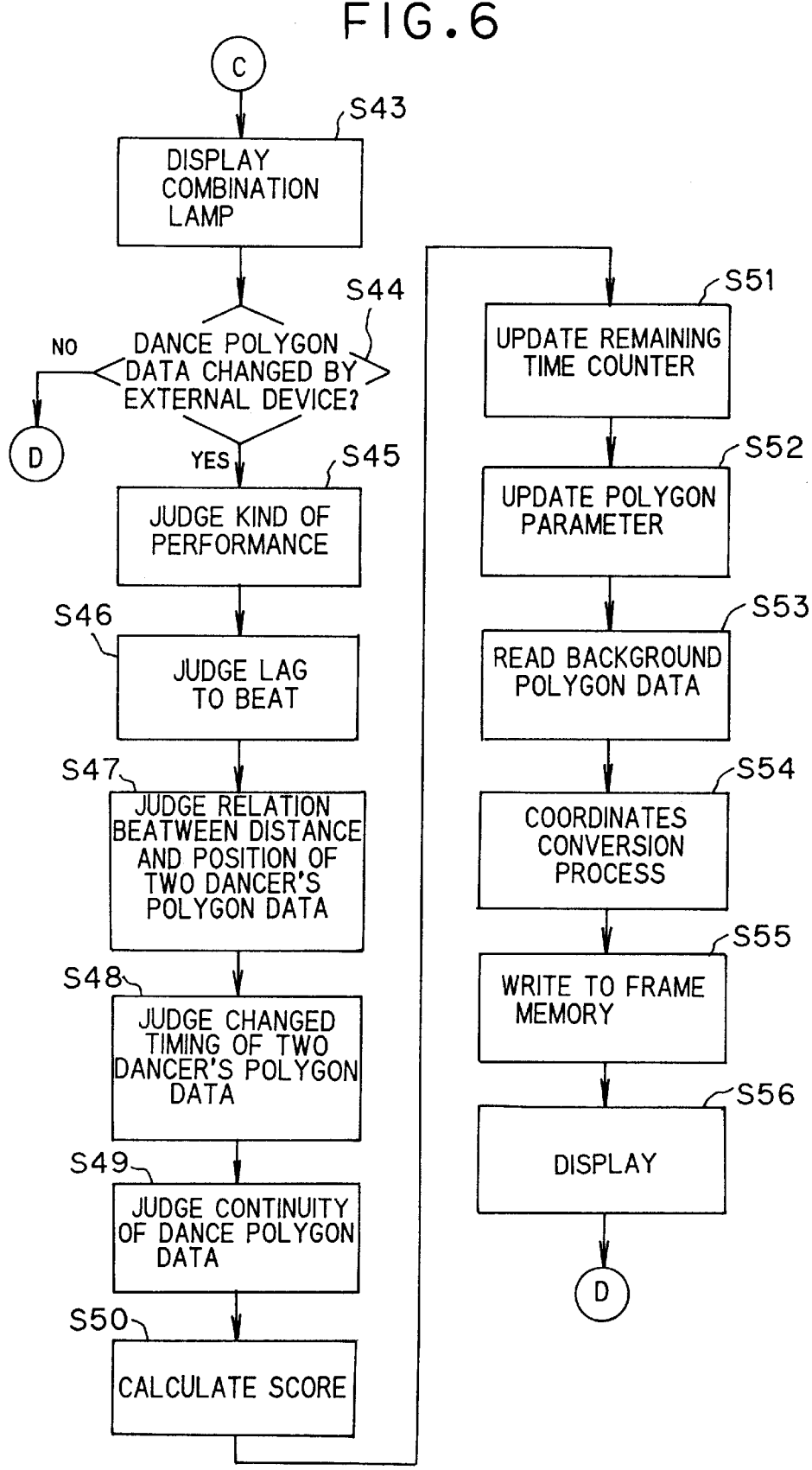
FIG. 6 is a flowchart showing another portion of the operation of the first embodiment.

If it is not the timing at which the combination performance can be played (Step S28: NO), as shown in the flowchart of FIG. 5, the CPU 1 judges whether or not a combination lamp for indicating the timing at which the combination performance can be played is displayed (Step S29). If the combination lamp is displayed (Step S29: YES), the display of the combination lamp is extinguished (Step S30). After the step S29 (NO) or S30, the game player operates the operation section 6 so that the displayed dancer plays the performance, and then it is judged whether or not the polygon data for the dancer is changed (Step S31).

If it is not changed (Step S31: NO), the operational flow returns to the step S18 in FIG. 4. In FIG. 5 again, if it is changed (Step S31: YES), the CPU 1 judges the kind of the operated performance (Step S32), and then detects a time lag or shift between the timing when the operation section 6 is operated (i.e., the performance is played) and the timing of the beat signal of the dance music (Step S33). Then, the CPU 1 judges whether or not there is any relation between the previous performance and the present performance when the game player operates to consecutively play the performance, by detecting a relation to the dancer polygon data prior to the operation (Step S34). Then, the CPU 1 judges whether or not there is any continuity between the previous performance and the present performance when the game player operates to consecutively play the performance, by detecting a timing when the operation section 6 is continuously operated (Step S35). Then, the CPU 1 as one example of the score calculating device calculates the score based on the judgment results at the steps S32 to S35 (Step S36), and calculates the remaining time corresponding to the score to thereby update (add) the remaining time counter (Step S37).

Next, the polygon parameters changed in a similar manner as to the steps S9 to S13 are set in the polygon parameter memory 7 (Step S38). The background polygon data at that time is read from the polygon data memory 8 (Step S39). The coordinates conversion process is performed by the coordinates conversion processing device 9 (Step S40). Then, the processed result is written into the frame memory 11 (Step S41), and is then displayed on the display device 12 (Step S42). That is, by the processes at the steps S29 to S42, the display is carried out so as to play the personal performance such that the performance is played for the dancer whom the game player intends to operate, irrespective of the other dancer.

On the other hand, when judging at the step S28 in FIG. 4 that it is the timing of playing the combination performance (step S28: YES), the combination lamp is displayed as shown in the flow chart of FIG. 6 (Step S43). Then, it is judged whether or not the polygon data of the dancer is changed, as the game player operates the operation section 6 so that the displayed dancer plays the performance (Step S44). If it is not changed (Step S44: NO), the operational flow returns to the step S18 in FIG. 4. Namely, the state in which this combination lamp is displayed is such a state that the CPU 1 as one example of the dance performance data selection permitting device allows the selection of the combination performance, so that, if the polygon data is changed by the operation of the operation section 6 so as to play the combination performance (Step S44: YES), the kind of the operated combination performance is judged (Step S45). Then, a time lag or shift between the timing when the operation section 6 is operated and the timing of the beat signal of the dance music is detected (Step S46). Then, the distance and positional relation between the polygon data of one dancer and the polygon data of the other dancer are detected (Step S47). Next, a time relation between the timing when the performance is played by the dancer whom the game player operates by the operation section 6 so as to move it, and the timing when the performance is played by the other dancer is detected. That is, the time relation (lag) between the changed timings of the polygon data for the two dancers is detected (Step S48).

Next, by detecting the timing when the operation section 6 is continuously operated, it is judged whether or not there is a continuity between the previous performance and the present performance when the game player operates to continuously play the performance (Step S49). Then, the score is calculated on the basis of the judgment results of the steps S45 to S49 (Step S50). The remaining time corresponding to the score is calculated, and the remaining time counter is updated (added) (Step S51).

The processes same as those at the steps S38 to S42 are performed (Steps S52 to S56). In this manner, by the processes at the steps S43 to S56, the display is performed so as to play the combination performance in such a way that a performance is simultaneously played by the dancer whom the game player intends to operate and the other dancer.

As mentioned above, according to the present embodiment, the game player can obtain a high score by playing various dance performances in harmonization with the beat timing of the dance music, and can enjoy a time-extended play based on the score. Thus, it is possible to compete not only for the conventionally simply operational skill but also for a music sense or an art sense with regard to the dance, and thereby possible to realize an enjoyment which has never been experienced before.

Moreover, the combination performance can be played by operating in such a way that the two game players let the two dancers play the dance. Accordingly, the score is affected by not only the time lag or shift with respect to the above mentioned beat timing, but also the time lag or shift between the timings of the dance performances played by the two dancers. Hence, it is possible to enjoy a new game in which the cooperation between the game players is competed, which has never been experienced before.

[Second Embodiment]

Next, a second embodiment of the present invention is explained with reference to FIG. 7. Explanations of the portions common to the first embodiment are omitted.

Figure 7:
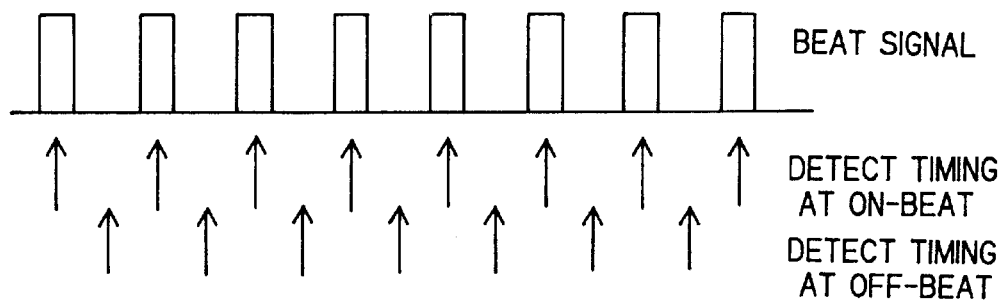
FIG. 7 is a timing chart showing a detection timing of a beat signal in a second embodiment of the present invention.

In the first embodiment, the timing of the on-beat and the timing of the played performance are detected as shown in FIG. 7, and the score is calculated on the basis of the time lag or shift between both of these timings. However, in the second embodiment, a timing of an off-beat and the timing of the played performance are detected as shown in FIG. 7 to thereby calculate the score on the basis of the time lag or shift between both of these timings.

In this manner, since the score can be calculated at any of the beat timings, the appropriate score can be calculated on the basis of the kind of the dance music.

[Third Embodiment]

Next, a third embodiment of the present invention is explained. Explanations of the portions common to the first embodiment are omitted.

In the first embodiment, the case where the two dancers are externally operated by the respective game players is explained. However, in addition to the above mentioned mode, a mode is included in the third embodiment, in which one dancer is externally operated while the other dancer is automatically controlled to play a dance according to a program which is stored in advance by the CPU 1 as one example of the readout control device.

For example, in a case of a social dance in which a step is defined, even one game player can enjoy the game by including such a mode.

[Fourth Embodiment]

Next, a fourth embodiment of the present invention is explained. Explanations of the portions common to the first embodiment are omitted.

Figure 8:
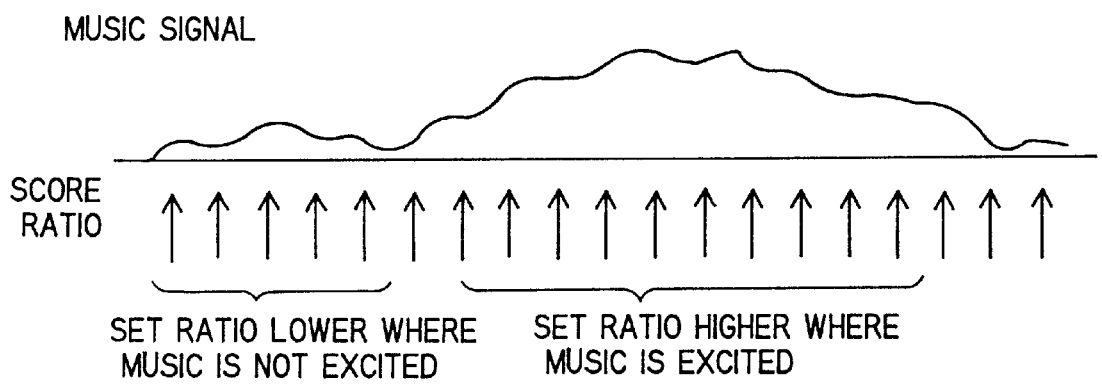
FIG. 8 is a timing chart showing a relation between dance music data and score ratio data in a fourth embodiment of the present invention.

In this embodiment, a score is set in accordance with a flow of a dance music. For example, as shown in FIG. 8, the dance music data has score ratio data with respect to a reproduction output of the dance music on a time axis. Then, if a performance is played when the dance music is at the climax, the score is set larger than that of the case where the same performance is played at a time of another reproduction.

For example, even if a certain performance has five points, a ratio is defined as 0.7 for a case that the performance is played when the dance music is not excited. Then, if the performance is played when the dance music is not excited, the score becomes 5×0.7=3.5. On the other hand, the ratio is defined as 1.5 for a case that the dance music is excited. Then, if the performance is played at this time, the score becomes 5×1.5=7.5.

According to this embodiment, the music sense or the art sense is required more and more. Hence, the pleasure of the game can be increased.

[Fifth Embodiment]

Next, a fifth embodiment of the present invention is explained. Explanations of the portions common to the first embodiment are omitted.

The personal performance and the combination performance are preset in the above mentioned embodiments. However, the fifth embodiment has a function of editing a performance, and thereby a game player can prepare a desirable performance by the external operation and set it in advance of actually playing the game. For example, for a certain performance, it is possible to set a dancer's pose before a performance is played by a game player and a dancer's pose after the performance is played. Then, if the operation section 6 is operated to play this performance, it is possible to carry out such a sequential display that the dancer has the pose before the performance is played, the performance is played, and the dance has the pose after the performance is played.

Actually, the image data and the like corresponding to the operation of the operation section 6 may be read out from the program/data ROM 2 by the CPU 1 as one example of the editing device, and may be stored into the data RAM 3 and the like, as the user data, in accordance with the operation of the operation section 6, while the selected pose is displayed on the display device 12 by the polygon paint device 10 and the like.

[Sixth Embodiment]

Next, a sixth embodiment of the present invention is explained. Explanations of the portions common to the first embodiment are omitted.

In the above mentioned embodiments, the information record medium, such as a CD, a DVD or the like installed in the dance game apparatus, may be used as the source of the dance music by the game sound source 4. In the information record medium, the dance music dedicated to the game apparatus is stored, such that not only the music data, but also the score ratio data may be stored in advance.

However, the present invention is not limited to it. Namely, the sixth embodiment is adapted to reproduce a general dance music CD as the information record medium. In this case, it may be provided with an extract device, constructed as one hardware unit or constructed in the CPU 1 according to the computer program, for extracting a beat component from a reproduction signal of the music CD by using a filter and the like.

[Seventh Embodiment]

Next, a seventh embodiment of the present invention is explained with reference to FIGS. 9 to 13. Explanations of the portions common to the first embodiment are omitted.

The seventh embodiment has an idling function of displaying a dynamic picture of a dancer in a basic movement corresponding to a dance music, even if an input operation for the performance is not carried out for the dancer by the operation section 6. The displayed picture on the display device 12 in this idling state is dynamically changed in accordance with the input operation of the performance for the dancer, and the dance music is also dynamically changed.

An operation of the video dance game apparatus in this embodiment is explained with reference to flowcharts in FIGS. 9 to 13. In these flowcharts, same steps as those in the flowcharts of FIGS. 3 to 6 used in the first embodiment carry the same step numbers, and the detailed explanations thereof are omitted.

Figure 9:
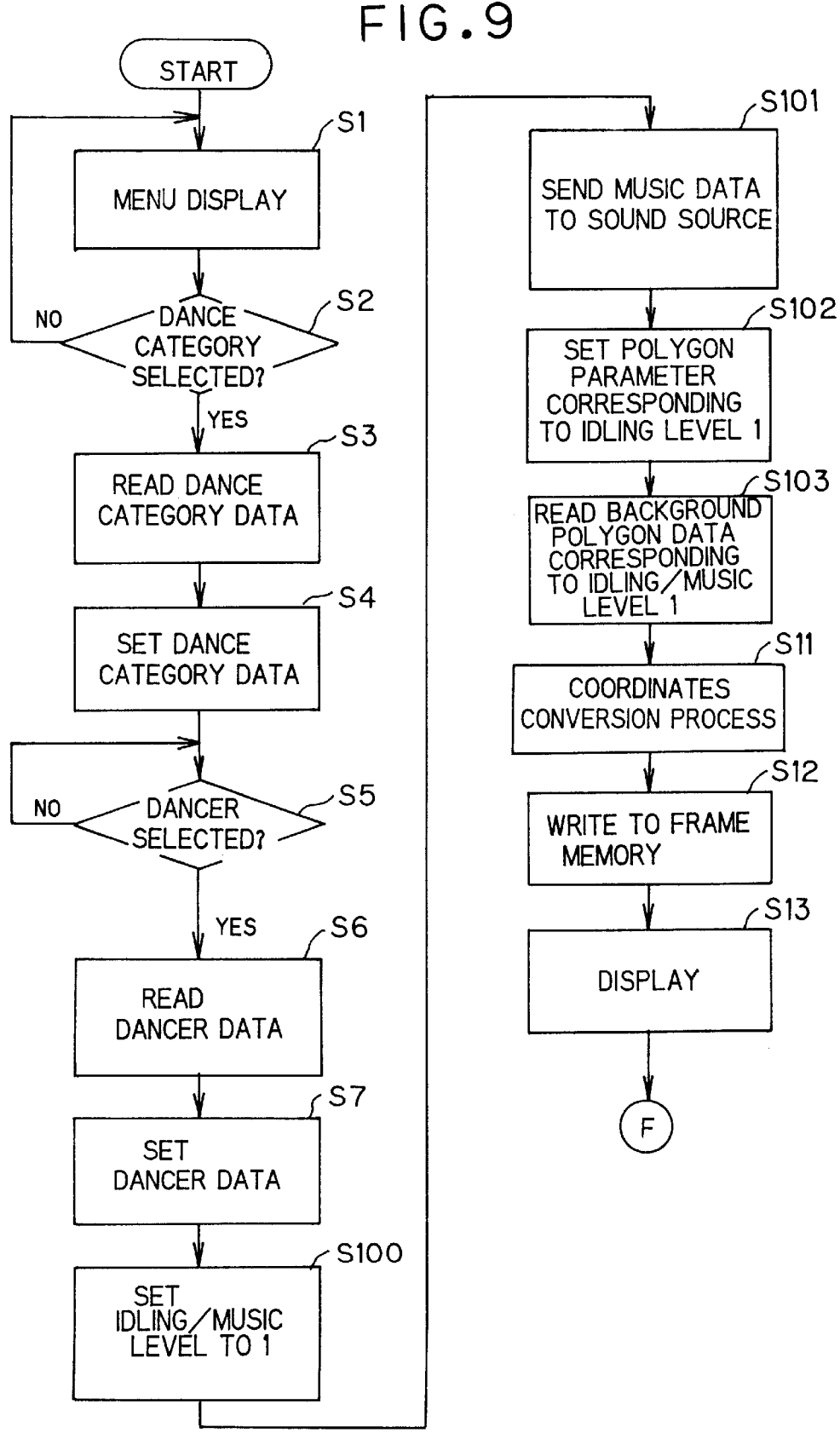
FIG. 9 is a flowchart showing one portion of an operation of a seventh embodiment of the present invention.

As shown in FIG. 9, this embodiment is similar to the first embodiment up to the step where the dance category and the dancer are selected and each data is stored into the data RAM 3 (Steps S1 to S7). However, in this embodiment, after that, an idling/music level as a basic movement level is set to "1" by the CPU 1 as one example of the basic movement level setting device (Step S100). This idling/music level is referred to when determining the variation degrees of the dancer's movement and the dance music in the idling state. As the operation by which a higher score can be obtained is carried out, the idling/music level is also set to a higher value.

When a music level is read out by the CPU 1 as one example of the dance music control device, since a first music level is "1" (i.e. a level at the beginning), the music data corresponding to the music level "1" is sent to the game sound source 4 by the CPU 1 as one example of the dance music control device, on the basis of the dance category data (Step S101). When an idling level is similarly read out by the CPU 1 as one example of the basic movement level selecting and reading out device, since the idling level is "1" at first, the basic movement data is read out so as to let the dancer play an idling dynamic picture operation (e.g., stepping of taps) corresponding to the idling level "1". That is, a position of the dancer and a coordinates conversion equation with regard thereto as the basic movement data are selected and read out from the program/data ROM 2 as one example of the basic movement data memory device, by the CPU 1 as one example of the basic movement level selecting and reading out device, and then the position of the read out dancer and the coordinates conversion equation with regard thereto are set and stored into the polygon parameter memory 7 (Step S102). Moreover, the polygon data with regard to the background corresponding to the idling/music level "1" is read out from the polygon data memory 8 (Step S103). Then, the coordinates conversion process is performed by the coordinates conversion processing device 9 as one example of the basic movement control device similarly to the first embodiment (Step S11). The converted polygon data is written into the frame memory 11 by the polygon paint device 10 (Step S12), and is then displayed on the display device 12 (Step S13). Thanks to the above mentioned processes, even if the external input is not carried out from the operation section 6, the dancer in the idling state can be moved in harmonization with the beat of the dance music. Hence, it is possible to really represent the dancer's movement.

Figure 10:
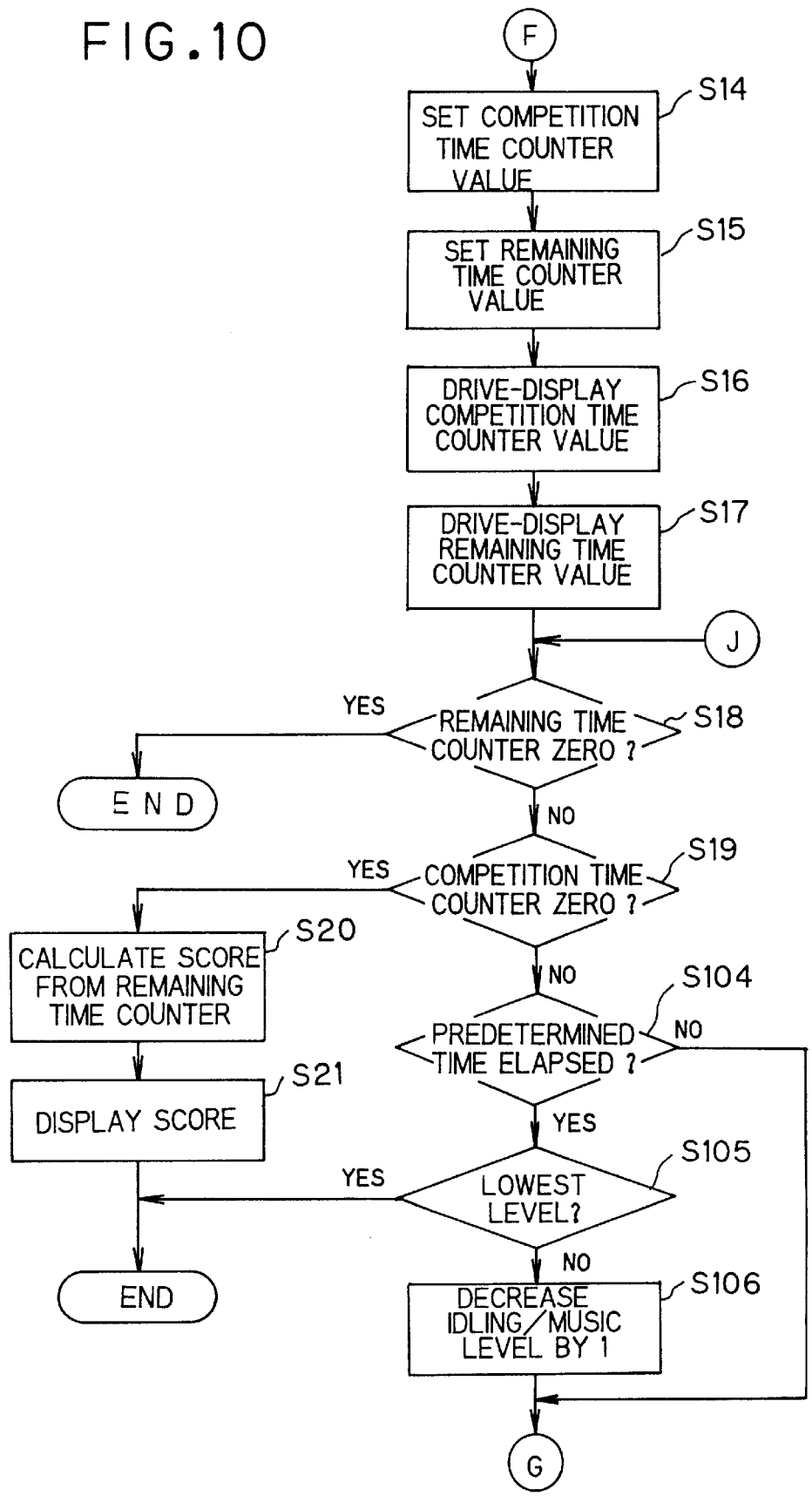
FIG. 10 is a flowchart showing another portion of the operation of the seventh embodiment.

As shown in FIG. 10, after the competition time counter and the remaining time counter are set similarly to the first embodiment (Steps S14 to S15), the competition time counter and the remaining time counter are driven and displayed (Steps S16 to S17). Then, while it is judged whether or not the remaining time counter and the competition time counter become zero (Steps S18 to S19), the operational flow is in a waiting state for an input request of the dance performance data.

The waiting state for the input request of the dance performance data while counting the time as mentioned above is similar to the first embodiment. However, in this embodiment, even if the dance performance data is not inputted, the dancer's pose and the dance music are dynamically changed on the basis of the idling/music level. loreover, the value of the idling/music level is also changed.

That is, if the values of the remaining time counter and the competition time counter are not zero (Step S18 ; NO, Step S19 ; NO), it is judged by the CPU 1 as one example of the basic movement control device whether or not a predetermined time (for example, 30 seconds) is elapsed after that (Step S104). If it is elapsed (Step S104: YES), it is judged whether or not the idling/music level is the lowest level (Step S105). Then, if the predetermined time is elapsed when it is "1" indicating the lowest level (Step S104 ; YES, Step S105 ; YES), the game is finished.

However, if it does not become the highest level even after the elapse of the predetermined time (Step S105 ; NO), after the process of reducing the idling/music level by "1" is carried out by the CPU 1 as one example of the basic movement level setting device (Step S106), or if the predetermined time is not elapsed (Step S104 NO), the operational flow proceeds to the processes of the music data and the display data shown in FIG. 11, while the idling/music level is maintained at the original state.

Figure 11:
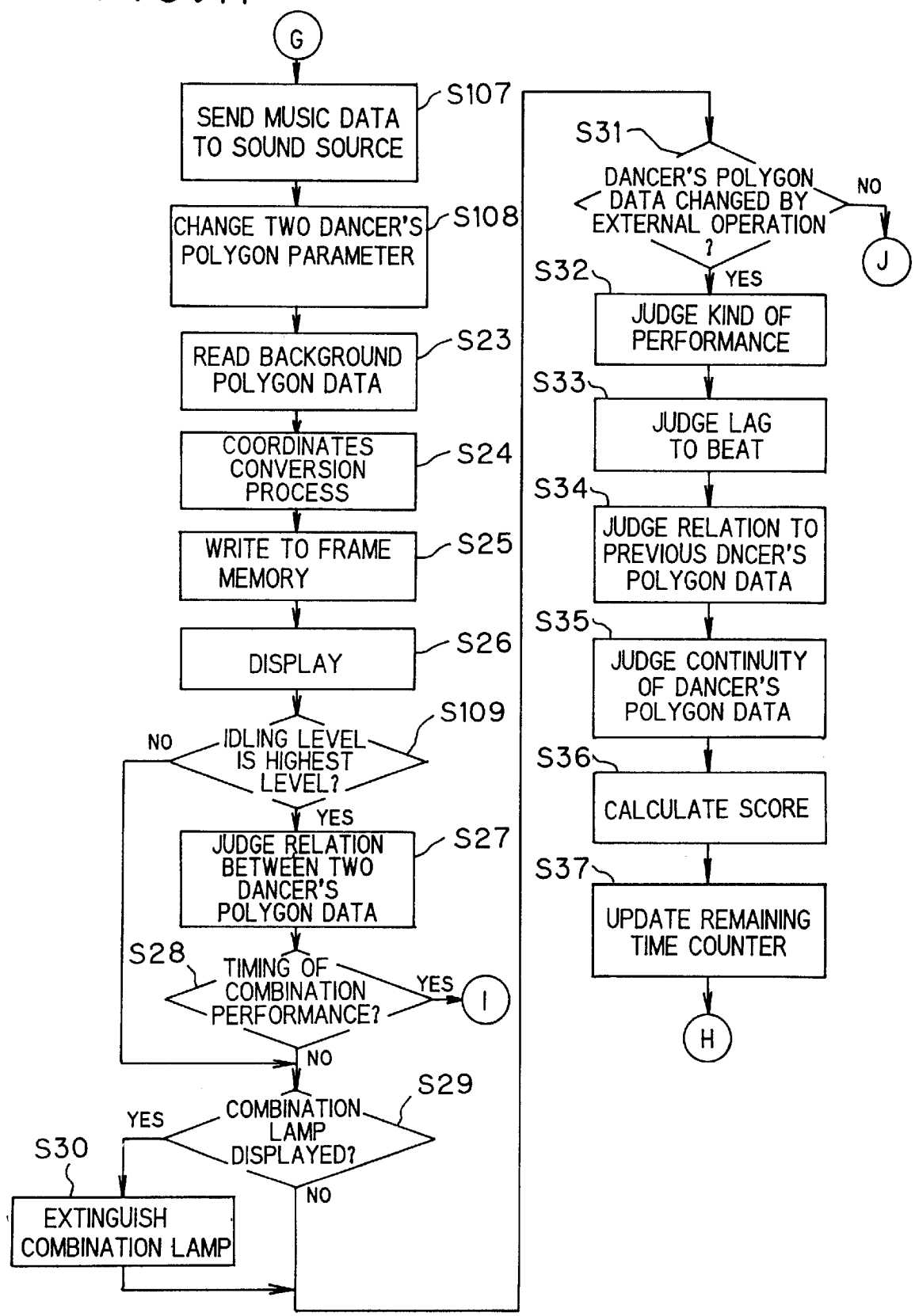
FIG. 11 is a flowchart showing another portion of the operation of the seventh embodiment.

Then, as shown in FIG. 11, the music data corresponding to the music level is sent to the game sound source 4 by the CPU 1 as one example of the dance music control device (Step S107). Moreover, the polygon data of the two dancers is changed by the CPU 1 as one example of the basic movement level selecting and reading out device, on the basis of the idling level, and is then set into the polygon parameter memory 7 (Step S108). Further, similarly to the first embodiment, the polygon data with regard to the background at this time is read from the polygon data memory 8 (Step S23). The coordinates conversion process is performed (Step S24). The converted polygon data is written into the frame memory 11 by the polygon paint device 10 (Step S25), and is then displayed on the display device 12 (Step S26).

The idling/music level becomes gradually lower, if the dance performance data is not inputted within the predetermined time period, by carrying out the above mentioned processes, so that the dancer's movement and the dance music are changed into poor levels. Actually, the movement in the idling operation of the dancer becomes smaller, and the level of the dance music becomes lower, or the music becomes darker. Incidentally, although the predetermined time period is also measured by the counter, a value of the counter is set to an original value each time the external input is carried out.

After that, it is judged whether or not the idling/music level is the highest level (Step S109). If it is the highest level (Step S109 YES), the position, the distance and the like of the two dancers are detected by the CPU 1 as one example of the position judging device, similarly to the first embodiment (Step S27). Then, it is judged whether or not it is the timing when the combination performance can be played (Step S28). In this way, the combination performance can be played only when the idling/music level is the highest level, in this embodiment.

If it is not the timing when the combination performance can be played (Step S28 ; NO), the process for the combination lamp is performed similarly to the first embodiment (Steps S29 to S30). After that, the score calculation when the dance performance is played by the external input and the like are performed (Steps S31 to S37).

Figure 12:
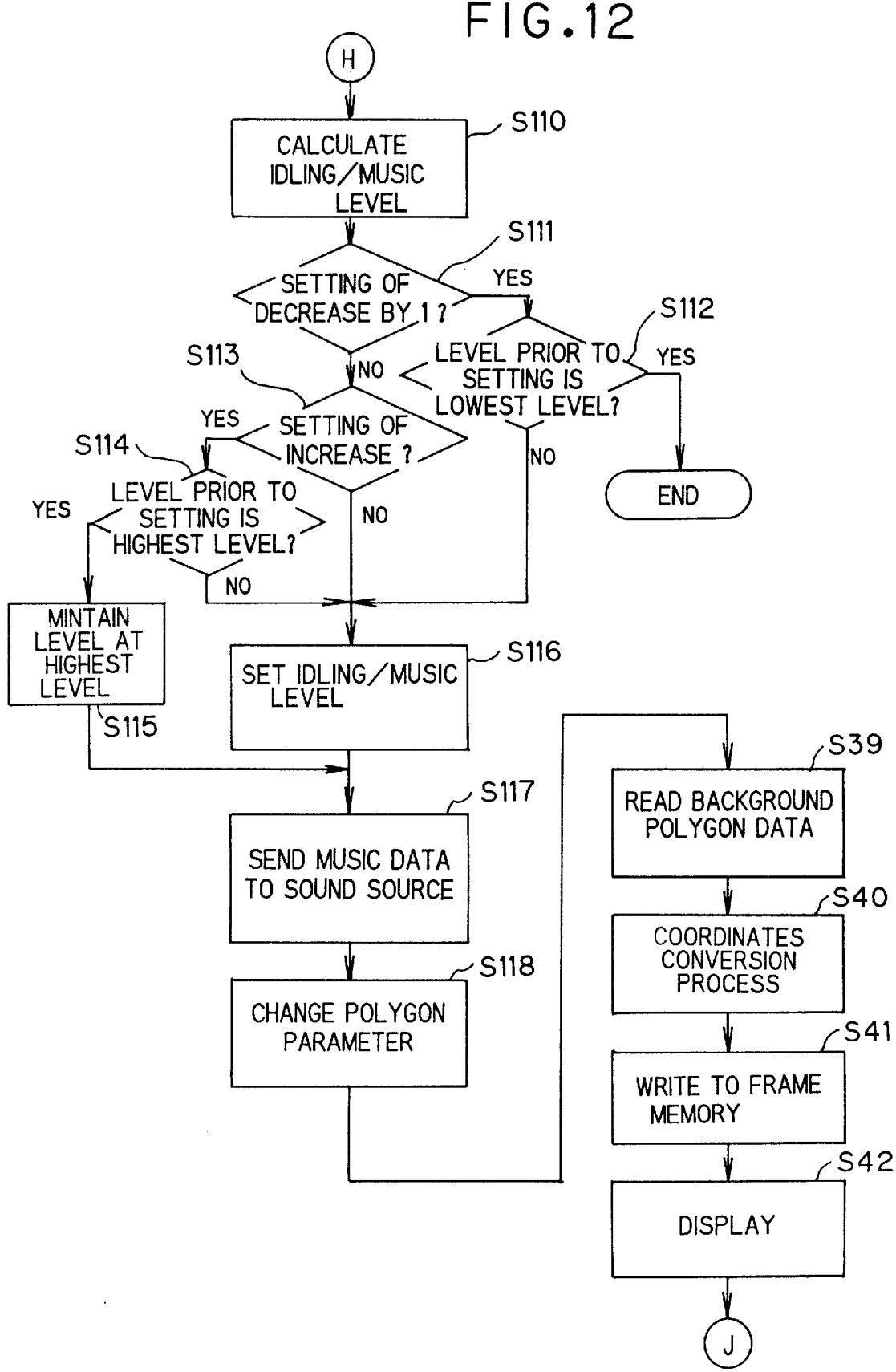
FIG. 12 is a flowchart showing another portion of the operation of the seventh embodiment.

After these processes, the display process is carried out in the first embodiment. However, in the seventh embodiment, prior to the display process, the idling/music level is calculated by the CPU 1 as one example of the basic movement level setting device, as shown in FIG. 12 (Step S110). This calculation is carried out in accordance with the process of judging the kind of the performance (Step S32) and the process of judging the time lag or shift between the timing when the performance is played and the beat (Step S33). For example, if it is not in harmonization with the beat, the level is set lower. If it is in harmonization with the beat or if it is a case of a higher performance, the level is set higher. In this embodiment, when the level is set lower, it is decreased by "1". When the level is set higher, it is increased by not less than "1".

Then, it is judged whether or not the level is to be set lower after this calculation (Step S111). If the level is to be set lower (Step S111; YES), it is judged whether or not a level prior to the setting is the lowest level (Step S112). If it is the lowest level (Step S112: YES), since the level becomes zero, the game is finished.

On the other hand, if the level is not to be set lower (Step S111; NO), it is judged whether or not the level is to be set higher (Step S113). If the level is to be set higher (Step S113; YES), it is judged whether or not a level prior to the setting is the highest level (Step S114). If it is the highest level (Step S114: YES), the level is not set higher, and the highest level is maintained (Step S115).

On the other hand, if the level is to be set lower (Step S111: YES and Step S112: NO), or if the level is to be set higher (Step S113: YES and Step S114: NO), or if the level is to be maintained at its original state (Step S113: NO), the process of setting the idling/music level is carried out (Step S116). After the step S115 (i.e., if the level prior to the setting is the highest level even when the level is to be set higher, and the process of maintaining at the highest level (Step S115) is carried out) or S116, the music data corresponding to the set music level is sent to the sound source 4 by the CPU 1 as one example of the dance music control device (Step S117). In order that the dance performance corresponding to the idling level is displayed by the CPU 1 as one example of the dance performance data selecting and reading out device, the dancer's position and the coordinates conversion equation with regard thereto as the dance performance data are selected and read out from the program/ data ROM 2. Then, the read out dancer's position and the coordinates conversion equation with regard thereto are set and stored into the polygon parameter memory 7 (Step S118). Then, the display process is carried out similarly to the first embodiment (Steps S39 to S42).

That is, in this embodiment, not only the score and the value of the remaining time counter are changed on the basis of the kind and the played timing of the dance performance, but also the idling/music level is changed. Moreover, even if the same dance performance is selected by the same operation, the dancer's movement and the music condition are differentiated on the basis of the idling/music level.

For example, in a case that an operation for enabling the dancer to jump is carried out, if the idling/music level is high, the dancer jumps high, or if the idling/music level is low, the dancer jumps low. Moreover, the higher is the idling/music level, the more gorgeous (the more excited) the dance music is. For example, as the idling/music level becomes higher, tones of the various instruments are added, and/or the sound volume is turned up.

After the dance performance is displayed in accordance with the external input process by the change of the polygon parameter and the display process as mentioned above, the operational display of the idling state corresponding to the idling state is carried out so as to follow the dance music, as shown in FIGS. 10 to 11. Then, the dance music corresponding to the music level is played (Steps S104 to S26).

Figure 13:
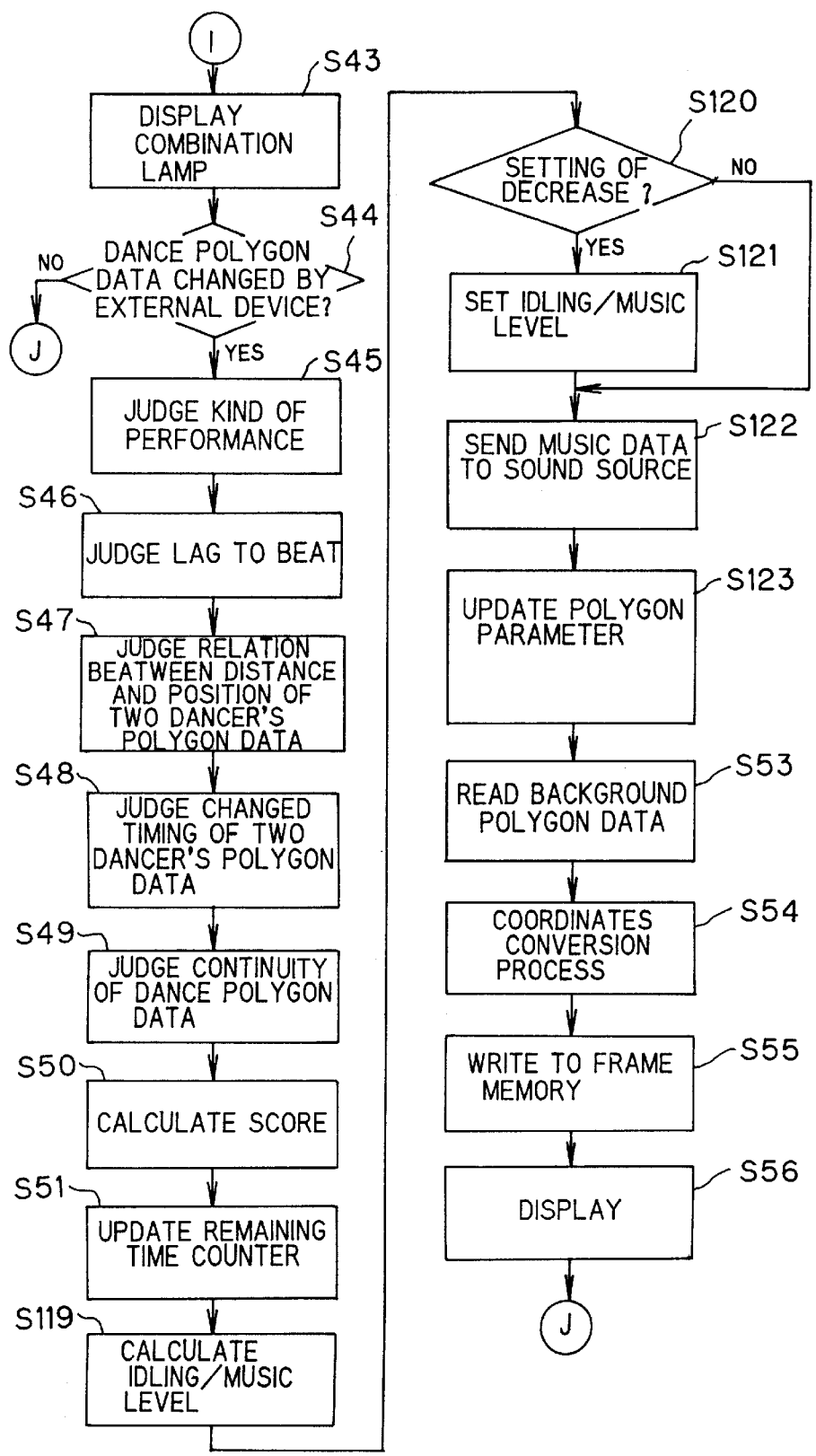
FIG. 13 is a flowchart showing another portion of the operation of the seventh embodiment.

On the other hand, in a case of the played timing of the combination performance at the step S28 shown in FIG. 11 (Step S28 YES), the display process of the combination lamp (Step S43) is carried out as shown in FIG. 13. After that, it is judged whether or not the external input is carried out (Step S44). If the external input is carried out (Step S44: YES), the score is calculated from the kind and the timing of the dance performance similarly to the first embodiment, and the remaining time counter is updated (Steps S45 to S51). In this embodiment, the idling/music level is further calculated from the kind and the timing of the dance performance at that time, by the CPU 1 as one example of the basic movement level setting device (Step S119). If the level is to be set lower (Step S120 ; YES), after the idling/music level is set lower (Step S121), or if the level is not to be set lower (Step S120: NO), the operational flow proceeds to the next processes of the music data and the display data, while the idling/music level is maintained at the original state. When the idling/music level is already in the highest level and it is to be set higher by "1", it is maintained at the highest level.

The music data corresponding to the music level set by the CPU 1 as one example of the dance music control device is sent to the sound source 4 (Step S122). The polygon parameter is changed by the CPU 1 as one example of the dance performance data selecting and reading out device so as to display the dance performance corresponding to the idling level, and is set in the polygon parameter memory 7 (Step S123). Then, the display process is carried out similarly to the first embodiment (Steps S53 to S56).

As mentioned above, not only the score and the value of the remaining time counter are changed on the basis of the kind and the timing of the dance performance, but also the idling/music level is changed, even in a case of the combination performance in this embodiment. Moreover, even if the same dance performance is selected by the same operation, the dancer's movement and the music condition are differentiated on the basis of the idling/music level. Furthermore, the dancer in the idling state carries out the idling operation in the state where the combination performance can be played.

As mentioned above, according to the present invention, the basic movement in harmonization with the music for the dancer is automatically carried out on the basis of the idling level. Hence, it is possible to implement the more real presentation. Moreover, the movement in the idling state is dynamically changed on the basis of the kind and the timing of the dance performance. Thus, the dynamically idling operation corresponds to the more dynamic dance. In a case of an undesirable dance or if it is difficult to play the dance in harmonization with the rhythm, the idling operation becomes gradually small. Hence, since the music sense or the art or cooperative feeling with regard to the dance can be reflected in the game, it is possible to improve the game feature.

As the operation in the idling state, the stepping of the taps is considered in this embodiment. However, the present invention is not limited to it. Then, it is possible to move in upper and lower directions or left and right directions. Or, the operation in the idling state may be selected by the input operation from the operation section 6.

According to the present embodiment, the music is changed on the basis of the dancer's movement as well as the exciting degree of the dance. Then the dance is excited, or when a high-degree dance pose is carried out, the sound excited in conjunction therewith is played. Hence, the game player can create the entertainment in which the dance and the music are integrated with each other by the dancer's operation.

It is the most desirable implementation to change the dancer's movement and the music in the idling state, as described in this embodiment. However, the present invention is not limited to it. It is possible to apply any one of them to the first embodiment and the like to thereby improve the entertainment feature.

Further, the implementation of this embodiment may be combined with the implementations of the second to sixth embodiments.

The case where the present invention is applied to the video game apparatus is explained in the above mentioned first to seventh embodiments. However, the present invention is not limited to them.

Figure 14:
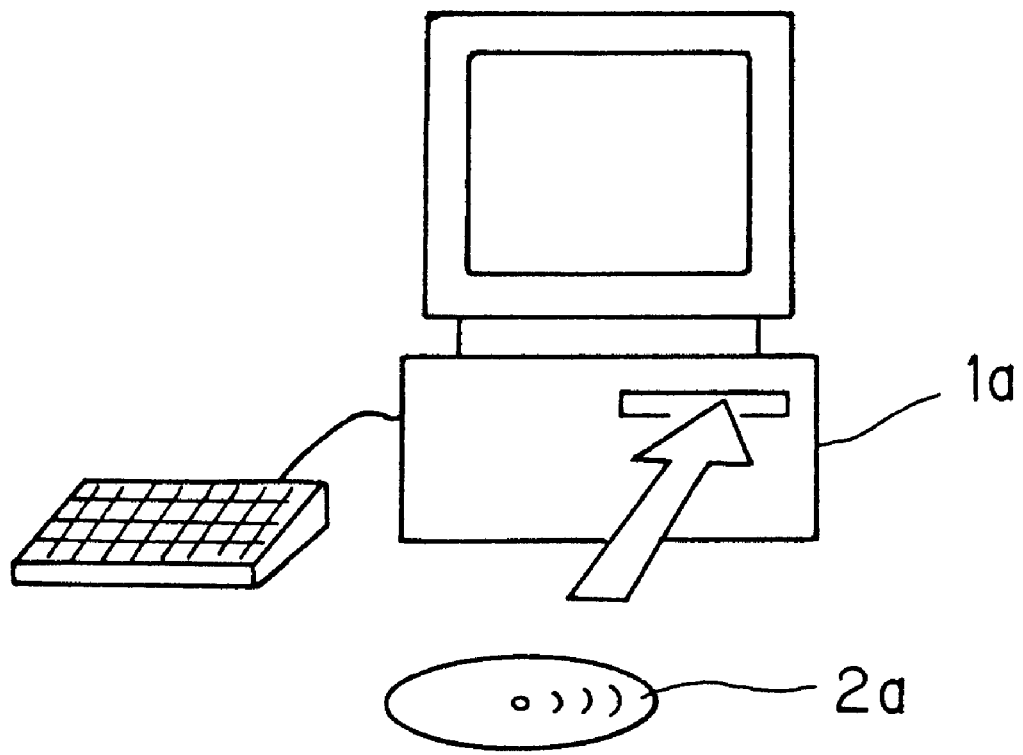
FIG. 14 is a perspective view of a modified embodiment of the present invention.

For example, as shown in FIG. 14, the present embodiment can be realized as a modified embodiment provided with a personal computer 1a as one example of the computer for the video dance game and an information record medium 2a, such as a CD-ROM, a DVD-ROM or the like as one example of the program storage device readable by the computer.

In this embodiment, the video dance game indicated by the above explained flow charts of FIGS. 3 to 6 and 9 to 13 in the first to seventh embodiments is mainly performed by a CPU, a memory, a display unit and an audio unit of the personal computer 1a. The control program corresponding to any one of the above explained flow charts of the embodiments is stored in the information record medium 2a in advance, and is read out therefrom through a reading device, such as a CD-ROM drive, a DVD-ROM drive or the like of the personal computer 1a, as the occasion demands. In addition, the information record medium 2a may store the video and audio data for the video dance game, such as the dance performance data, the dance music data and so on, in addition to the control program.

In this manner, the information record medium 2a as one example of the program storage device, tangibly embodies a program of instructions executable by the personal computer 1a to perform method processes for displaying the image of the dancers on the display unit of the personal computer 1a, and controlling the dancers in the displayed image to play various dance performances in accordance with the external operation through a key board, a mouse, a joy stick etc. of the personal computer 1a.

The control program or the video or audio data read from the information record medium 2a may be stored in a RAM in the personal computer 1a, so as to speedily execute the program. Alternatively, the control program may be stored in a ROM of the personal computer 1a in advance, or may be received through a wire or wireless communication line by use of a modem of the personal computer 1a and is stored into the RAM of the personal computer 1a.

In the above embodiments, the two dancers are displayed on the screen. However, it is allowable to display more than two dancers to thereby carry out the dance competition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A video dance game apparatus for displaying an image of at least two dancers on a screen and controlling the dancers in the displayed image to play various dance performances in accordance with an external operation to thereby offer a dance game, said video dance game apparatus comprising:

an image displaying device having the screen, for displaying the image of the dancers on the screen;

a dance music output device for outputting a music signal indicating a dance music;

a beat information generating device for generating beat information on the basis of the music signal;

a dance performance data memory device for storing a plurality of dance performance data pieces each indicating respective one of the various dance performances;

a dance performance data selecting and reading out device for selecting and reading out one of the dance performance data pieces stored in said dance performance data memory device;

an image control device for controlling said image displaying device to change the image of the dancers such that the dancers play a dance performance corresponding to the read out dance performance data piece;

an operation device by which the external operation is inputted, for operating said dance performance data selecting and reading out device in accordance with the external operation to select and read out said one of the dance performance data pieces, so as to change the dance performance of the dancers on the screen; and a score calculating device for calculating a game score on the basis of a time lag between a read-out timing, which is a timing at which the dance performance data piece is read out by said dance performance data selecting and reading out device in accordance with the external operation, and a generation timing of the beat information, which is a timing at which the beat information is generated by said beat information generating device.

2. A video dance game apparatus according to claim 1, further comprising:

a time measuring device for measuring time and restricting a time period, during which the external operation is inputted by said operation device, to a predetermined time period; and a time adjusting device for adjusting the predetermined time period on the basis of the game score calculated by said score calculating device.

3. A video dance game apparatus according to claim 1, wherein said score calculating device calculates the game score on the basis of at least one of a selection order of the dance performance data pieces in correspondence with the external operation, a mutual relation between the successively read dance performance data pieces, and a continuity between the successively read dance performance data pieces, in addition to the time lag.

4. A video dance game apparatus according to claim 3, further comprising:

a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece;

a basic movement level setting device for setting a basic movement level on the basis of at least one of the read-out timing, the selection order, the mutual relation and the continuity between the successively read dance performance data pieces;

a basic movement data selecting and reading out device for selecting and reading out one of the basic movement data pieces in accordance with the basic movement level set by said basic movement level setting device; and a basic movement control device for controlling said image displaying device to change the image of the dancers such that the dancers perform the predetermined movement corresponding to the read out basic movement data piece, when the image of the dancers is not changed in correspondence with the read dance performance data piece.

5. A video dance game apparatus according to claim 3, further comprising a dance music control device for controlling said dance music output device to change the music signal outputted therefrom in accordance with at least one of the read-out timing, the selection order, the mutual relation and the continuity between the successively read dance performance data pieces.

6. A video dance game apparatus according to claim 1, further comprising a dance music control device for controlling said dance music output device to change the music signal outputted therefrom in accordance with the read-out timing and the generation timing.

7. A video dance game apparatus according to claim 1, further comprising:

a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece;

a basic movement level setting device for setting a basic movement level on the basis of the time lag between the read-out timing and the generation timing;

a basic movement data selecting and reading out device for selecting and reading out one of the basic movement data pieces in accordance with the basic movement level set by said basic movement level setting device; and a basic movement control device for controlling said image displaying device to change the image of the dancers such that the dancers perform the predetermined movement corresponding to the read out basic movement data piece, when the image of the dancers is not changed in correspondence with the read dance performance data piece.

8. A video dance game apparatus according to claim 7, wherein:

said dance performance data memory device stores a plurality of dance performance data pieces indicating dance performances which movements are different from each other with respect to one kind of dance performance; and said dance performance data selecting and reading out device selects and reads out one of the dance performance data pieces stored in said dance performance data memory device in accordance with the basic movement level.

9. A video dance game apparatus according to claim 7, further comprising a dance music control device for controlling said dance music output device to change the music signal outputted therefrom in accordance with the basic movement level.

10. A video dance game apparatus for displaying an image of at least two dancers on a screen and controlling the dancers in the displayed image to play various dance performances in accordance with an external operation to thereby offer a dance game, said video dance game apparatus comprising:

an image displaying device having the screen, for displaying the image of the dancers on the screen;

a dance music output device for outputting a music signal indicating a dance music;

a beat information generating device for generating beat information on the basis of the music signal;

a dance performance data memory device for storing a plurality of dance performance data pieces each indicating respective one of the various dance performances;

a dance performance data selecting and reading out device for selecting and reading out one of the dance performance data pieces stored in said dance performance data memory device;

an image control device for controlling said image displaying device to change the image of the dancers such that the dancers play a dance performance corresponding to the read out dance performance data piece;

an operation device by which the external operation is inputted, for operating said dance performance data selecting and reading out device in accordance with the external operation to select and read out said one of the dance performance data pieces for at least one of the dancers, so as to change the dance performance of said at least one of the dancers on the screen;

a read-out control device for controlling said dance performance data selecting and reading out device to select and read out another of the dance performance data pieces for another of the dancers in a predetermined order and at a predetermined timing which are set in advance for said another of the dancers; and a score calculating device for calculating a game score on the basis of a time lag between a read-out timing, which is a timing at which the dance performance data piece is read out by said dance performance data selecting and reading out device in accordance with the external operation, and a generation timing of the beat information, which is a timing at which the beat information is generated by said beat information generating device.

11. A video dance game apparatus according to claim 10, further comprising:

a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece;

a basic movement level setting device for setting a basic movement level on the basis of the time lag between the read-out timing and the generation timing;

a basic movement data selecting and reading out device for selecting and reading out one of the basic movement data pieces in accordance with the basic movement level set by said basic movement level setting device; and a basic movement control device for controlling said image displaying device to change the image of the dancers such that the dancers perform the predetermined movement corresponding to the read out basic movement data piece, when the image of the dancers is not changed in correspondence with the read dance performance data piece.

12. A video dance game apparatus for displaying an image of at least two dancers on a screen and controlling the dancers in the displayed image to play various dance performances in accordance with an external operation to thereby offer a dance game, said video dance game apparatus comprising:

an image displaying device having the screen, for displaying the image of the dancers on the screen;

a dance music output device for outputting a music signal indicating a dance music;

a beat information generating device for generating beat information on the basis of the music signal;

a dance performance data memory device for storing a plurality of dance performance data pieces each indicating respective one of the various dance performances;

a dance performance data selecting and reading out device for selecting and reading out one of the dance performance data pieces stored in said dance performance data memory device;

an image control device for controlling said image displaying device to change the image of the dancers such that the dancers play a dance performance corresponding to the read out dance performance data piece;

an operation device by which the external operation is inputted, for operating said dance performance data selecting and reading out device in accordance with the external operation to select and read out said one of the dance performance data pieces, so as to change the dance performance of the dancers on the screen;

a judging device for judging a mutual relation between the dancers in the displayed image;

a dance performance data selection permitting device for permitting said dance performance data selecting and reading out device to select said one of the dance performance data pieces only from among the dance performance data pieces each indicating such a dance performance that movements of the dancers are interlocked with each other, in case that the judged mutual relation is a predetermined relation; and a score calculating device for calculating a game score on the basis of the read out dance performance data piece in correspondence with the external operation.

13. A video dance game apparatus according to claim 12, wherein:

said judging device judges a mutual positional relation between the dancers in the displayed image, as the mutual relation; and said score calculating device calculates the game score on the basis of at least one of a read-out timing, which is a timing at which the dance performance data piece is read out by said dance performance data selecting and reading out device, the mutual positional relation, a selection order of the dance performance data pieces, a mutual relation between the successively read dance performance data pieces, and a continuity between the successively read dance performance data pieces, in correspondence with the external operation.

14. A video dance game apparatus according to claim 13, further comprising:

a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece;

a basic movement level setting device for setting a basic movement level on the basis of at least one of the read-out timing, the mutual positional relation, the selection order, the mutual relation and the continuity between the successively read dance performance data pieces;

a basic movement data selecting and reading out device for selecting and reading out one of the basic movement data pieces in accordance with the basic movement level set by said basic movement level setting device; and a basic movement control device for controlling said image displaying device to change the image of the dancers such that the dancers perform the predetermined movement corresponding to the read out basic movement data piece, when the image of the dancers is not changed in correspondence with the read dance performance data piece.

15. A video dance game apparatus according to claim 13, further comprising a dance music control device for controlling said dance music output device to change the music signal outputted therefrom in accordance with at least one of the read-out timing, the mutual positional relation, the selection order, the mutual relation and the continuity between the successively read dance performance data pieces.

16. A video dance game apparatus according to claim 12, further comprising a dance music control device for controlling said dance music output device to change the music signal outputted therefrom in accordance with the read dance performance data piece.

17. A video dance game apparatus according to claim 12, further comprising:

a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece;

a basic movement level setting device for setting a basic movement level on the basis of the read dance performance data piece;

a basic movement data selecting and reading out device for selecting and reading out one of the basic movement data pieces in accordance with the basic movement level set by said basic movement level setting device; and a basic movement control device for controlling said image displaying device to change the image of the dancers such that the dancers perform the predetermined movement corresponding to the read out basic movement data piece, when the image of the dancers is not changed in correspondence with the read dance performance data piece.

18. A video dance game apparatus for displaying an image of at least two dancers on a screen and controlling the dancers in the displayed image to play various dance performances in accordance with an external operation to thereby offer a dance game, said video dance game apparatus comprising:

an image displaying device having the screen, for displaying the image of the dancers on the screen;

a dance music output device for outputting a music signal indicating a dance music;

a beat information generating device for generating beat information on the basis of the music signal;

a dance performance data memory device for storing a plurality of dance performance data pieces each indicating respective one of the various dance performances;

a dance performance data selecting and reading out device for selecting and reading out one of the dance performance data pieces stored in said dance performance data memory device;

an image control device for controlling said image displaying device to change the image of the dancers such that the dancers play a dance performance corresponding to the read out dance performance data piece;

an operation device by which the external operation is inputted, for operating said dance performance data selecting and reading out device in accordance with the external operation to select and read out said one of the dance performance data pieces for at least one of the dancers, so as to change the dance performance of said at least one of the dancers on the screen;

a read-out control device for controlling said dance performance data selecting and reading out device to select and read out another of the dance performance data pieces for another of the dancers in a predetermined order and at a predetermined timing which are set in advance for said another of the dancers;

a judging device for judging a mutual relation between the dancers in the displayed image;

a dance performance data selection permitting device for permitting said dance performance data selecting and reading out device to select said one of the dance performance data pieces only from among the dance performance data pieces each indicating such a dance performance that movements of the dancers are interlocked with each other, in case that the judged mutual relation is a predetermined relation; and a score calculating device for calculating a game score on the basis of the read out dance performance data piece in correspondence with the external operation.

19. A video dance game apparatus according to claim 18, further comprising a dance music control device for controlling said dance music output device to change the music signal outputted therefrom in accordance with the read dance performance data piece.

20. A video dance game apparatus according to claim 18, further comprising:

a basic movement data memory device for storing a plurality of basic movement data pieces to change the image in various manners respectively such that the dancers perform a predetermined movement in accordance with the outputted dance music when the image of the dancers is not changed in correspondence with the read dance performance data piece;

a basic movement level setting device for setting a basic movement level on the basis of the read dance performance data piece;

a basic movement data selecting and reading out device for selecting and reading out one of the basic movement data pieces in accordance with the basic movement level set by said basic movement level setting device; and a basic movement control device for controlling said image displaying device to change the image of the dancers such that the dancers perform the predetermined movement corresponding to the read out basic movement data piece, when the image of the dancers is not changed in correspondence with the read dance performance data piece.

21. A program storage device readable by a computer for a video dance game, tangibly embodying a program of instructions executable by said computer to perform method processes for displaying an image of at least two dancers on a screen and controlling the dancers in the displayed image to play various dance performances in accordance with an external operation to thereby offer a dance game, said program storage device storing a plurality of dance performance data pieces each indicating respective one of the various dance performances, said computer comprising an operation device by which the external operation is inputted, said method processes comprising:

displaying the image of the dancers on the screen;

outputting a music signal indicating a dance music;

generating beat information on the basis of the music signal;

selecting and reading out one of the dance performance data pieces stored in said program storage device, in accordance with the external operation when the external operation is inputted by said operation device so as to change the dance performance of the dancers on the screen;

changing the image of the dancers on the screen such that the dancers play a dance performance corresponding to the read out dance performance data piece; and calculating a game score on the basis of a time lag between a read-out timing, which is a timing at which the dance performance data piece is read out in accordance with the external operation, and a generation timing of the beat information, which is a timing at which the beat information is generated.

22. A program storage device according to claim 21, wherein said method processes further comprise:

measuring time and restricting a time period, during which the external operation is inputted by said operation device, to a predetermined time period; and adjusting the predetermined time period on the basis of the game score calculated by said score calculating process.

23. A program storage device according to claim 21, wherein said score calculating process calculates the game score on the basis of at least one of a selection order of the dance performance data pieces in correspondence with the external operation, a mutual relation between the successively read dance performance data pieces, and a continuity between the successively read dance performance data pieces, in addition to the time lag.

24. A program storage device according to claim 23, wherein said program storage device further stores a plurality of basic movement data pieces to change the image in various manners respectively such that the dancers perform a predetermined movement in accordance with the outputted dance music when the image of the dancers is not changed in correspondence with the read dance performance data piece, said method processes further comprise:

setting a basic movement level on the basis of at least one of the read-out timing, the selection order, the mutual relation and the continuity between the successively read dance performance data pieces;

selecting and reading out one of the basic movement data pieces in accordance with the basic movement level set by said basic movement level setting process; and changing the image of the dancers on the display such that the dancers perform the predetermined movement corresponding to the read out basic movement data piece, when the image of the dancers is not changed in correspondence with the read dance performance data piece.

25. A program storage device according to claim 23, wherein said method processes further comprise changing the music signal outputted from said computer in accordance with at least one of the read-out timing, the selection order, the mutual relation and the continuity between the successively read dance performance data pieces.

26. A program storage device according to claim 21, wherein said method processes further comprise changing the music signal outputted from said computer in accordance with the read-out timing and the generation timing.

27. A program storage device according to claim 21, wherein said program storage device further stores a plurality of basic movement data pieces to change the image in various manners respectively such that the dancers perform a predetermined movement in accordance with the outputted dance music when the image of the dancers is not changed in correspondence with the read dance performance data piece, said method processes further comprise:

setting a basic movement level on the basis of the time lag between the read-out timing and the generation timing;

selecting and reading out one of the basic movement data pieces in accordance with the basic movement level set by said basic movement level setting process; and changing the image of the dancers on the screen such that the dancers perform the predetermined movement corresponding to the read out basic movement data piece, when the image of the dancers is not changed in correspondence with the read dance performance data piece.

28. A program storage device according to claim 27, wherein:

said program storage device stores a plurality of dance performance data pieces indicating dance performances which movements are different from each other with respect to one kind of dance performance; and said selecting and reading out process selects and reads out one of the dance performance data pieces stored in said program storage device in accordance with the basic movement level.

29. A program storage device according to claim 27, wherein said method processes further comprise changing the music signal outputted from said computer in accordance with the basic movement level.

30. A program storage device readable by a computer for a video dance game, tangibly embodying a program of instructions executable by said computer to perform method processes for displaying an image of at least two dancers on a screen and controlling the dancers in the displayed image to play various dance performances in accordance with an external operation to thereby offer a dance game, said program storage device storing a plurality of dance performance data pieces each indicating respective one of the various dance performances, said computer comprising an operation device by which the external operation is inputted, said method processes comprising:

displaying the image of the dancers on the screen;

outputting a music signal indicating a dance music;

generating beat information on the basis of the music signal;

selecting and reading out one of the dance performance data pieces for at least one of the dancers stored in said program storage device, in accordance with the external operation when the external operation is inputted by said operation device so as to change the dance performance of said at least one of the dancers on the screen;

selecting and reading out another of the dance performance data pieces for another of the dancers in a predetermined order and at a predetermined timing which are set in advance for said another of the dancers;

changing the image of the dancers on the screen such that the dancers play a dance performance corresponding to the read out dance performance data piece; and calculating a game score on the basis of a time lag between a read-out timing, which is a timing at which the dance performance data piece is read out in accordance with the external operation, and a generation timing of the beat information, which is a timing at which the beat information is generated.

31. A program storage device according to claim 30, wherein said program storage device further stores a plurality of basic movement data pieces to change the image in various manners respectively such that the dancers perform a predetermined movement in accordance with the outputted dance music when the image of the dancers is not changed in correspondence with the read dance performance data piece, said method processes further comprise:

setting a basic movement level on the basis of the time lag between the read-out timing and the generation timing;

selecting and reading out one of the basic movement data pieces in accordance with the basic movement level set by said basic movement level setting process; and changing the image of the dancers on the screen such that the dancers perform the predetermined movement corresponding to the read out basic movement data piece, when the image of the dancers is not changed in correspondence with the read dance performance data piece.

32. A program storage device readable by a computer for a video dance game, tangibly embodying a program of instructions executable by said computer to perform method processes for displaying an image of at least two dancers on a screen and controlling the dancers in the displayed image to play various dance performances in accordance with an external operation to thereby offer a dance game, said program storage device storing a plurality of dance performance data pieces each indicating respective one of the various dance performances, said computer comprising an operation device by which the external operation is inputted, said method processes comprising:

displaying the image of the dancers on the screen;

outputting a music signal indicating a dance music;

generating beat information on the basis of the music signal;

selecting and reading out one of the dance performance data pieces stored in said program storage device, in accordance with the external operation when the external operation is inputted by said operation device so as to change the dance performance of the dancers on the screen;

changing the image of the dancers on the screen such that the dancers play a dance performance corresponding to the read out dance performance data piece;

judging a mutual relation between the dancers in the displayed image;

permitting said selecting and reading out process to select said one of the dance performance data pieces only from among the dance performance data pieces each indicating such a dance performance that movements of the dancers are interlocked with each other, in case that the judged mutual relation is a predetermined relation; and calculating a game score on the basis of the read out dance performance data piece in correspondence with the external operation.

33. A program storage device according to claim 32, wherein:

said judging process judges a mutual positional relation between the dancers in the displayed image, as the mutual relation; and said score calculating process calculates the game score on the basis of at least one of a read-out timing, which is a timing at which the dance performance data piece is read out by said selecting and reading out process, the mutual positional relation, a selection order of the dance performance data pieces, a mutual relation between the successively read dance performance data pieces, and a continuity between the successively read dance performance data pieces, in correspondence with the external operation.

34. A program storage device according to claim 33, wherein said program storage device further stores a plurality of basic movement data pieces to change the image in various manners respectively such that the dancers perform a predetermined movement in accordance with the outputted dance music when the image of the dancers is not changed in correspondence with the read dance performance data piece, said method processes further comprise:

setting a basic movement level on the basis of at least one of the read-out timing, the mutual positional relation, the selection order, the mutual relation and the continuity between the successively read dance performance data pieces;

selecting and reading out one of the basic movement data pieces in accordance with the basic movement level set by said basic movement level setting process; and changing the image of the dancers on the screen such that the dancers perform the predetermined movement corresponding to the read out basic movement data piece, when the image of the dancers is not changed in correspondence with the read dance performance data piece.

35. A program storage device according to claim 33, wherein said method processes further comprise changing the music signal outputted from said computer in accordance with at least one of the read-out timing, the mutual positional relation, the selection order, the mutual relation and the continuity between the successively read dance performance data pieces.

36. A program storage device according to claim 32, wherein said method processes further comprise changing the music signal outputted from said computer in accordance with the read dance performance data piece.

37. A program storage device according to claim 32, wherein said program storage device further stores a plurality of basic movement data pieces to change the image in various manners respectively such that the dancers perform a predetermined movement in accordance with the outputted dance music when the image of the dancers is not changed in correspondence with the read dance performance data piece, said method processes further comprise:

setting a basic movement level on the basis of the read dance performance data piece;

selecting and reading out one of the basic movement data pieces in accordance with the basic movement level set by said basic movement level setting process; and changing the image of the dancers on the screen such that the dancers perform the predetermined movement corresponding to the read out basic movement data piece, when the image of the dancers is not changed in correspondence with the read dance performance data piece.

38. A program storage device readable by a computer for a video dance game, tangibly embodying a program of instructions executable by said computer to perform method processes for displaying an image of at least two dancers on a screen and controlling the dancers in the displayed image to play various dance performances in accordance with an external operation to thereby offer a dance game, said program storage device storing a plurality of dance performance data pieces each indicating respective one of the various dance performances, said computer comprising an operation device by which the external operation is inputted, said method processes comprising:

displaying the image of the dancers on the screen;

outputting a music signal indicating a dance music;

generating beat information on the basis of the music signal;

selecting and reading out one of the dance performance data pieces for at least one of the dancers stored in said program storage device, in accordance with the external operation when the external operation is inputted by said operation device so as to change the dance performance of said at least one of the dancers on the screen;

selecting and reading out another of the dance performance data pieces for another of the dancers in a predetermined order and at a predetermined timing which are set in advance for said another of the dancers;

changing the image of the dancers on the screen such that the dancers play a dance performance corresponding to the read out dance performance data piece;

judging a mutual relation between the dancers in the displayed image;

permitting said selecting and reading out process to select said one of the dance performance data pieces only from among the dance performance data pieces each indicating such a dance performance that movements of the dancers are interlocked with each other, in case that the judged mutual relation is a predetermined relation; and calculating a game score on the basis of the read out dance performance data piece in correspondence with the external operation.

39. A program storage device according to claim 38, wherein said method processes further comprise changing the music signal outputted from said computer in accordance with the read dance performance data piece.

40. A program storage device according to claim 38, wherein said program storage device further stores a plurality of basic movement data pieces to change the image in various manners respectively such that the dancers perform a predetermined movement in accordance with the outputted dance music when the image of the dancers is not changed in correspondence with the read dance performance data piece, said method processes further comprise:

setting a basic movement level on the basis of the read dance performance data piece;

selecting and reading out one of the basic movement data pieces in accordance with the basic movement level set by said basic movement level setting process; and changing the image of the dancers on the screen such that the dancers perform the predetermined movement corresponding to the read out basic movement data piece, when the image of the dancers is not changed in correspondence with the read dance performance data piece.

* * * * *

UNITED STATES PATENT AND TRADEMARK OFFICE
CERTIFICATE OF CORRECTION

PATENT NO.    : 6,001,013
DATED         : December 14, 1999
INVENTOR(S)   : Izumi Ota It is certified that error appears in the above-identified patent and that said Letters Patent is hereby corrected as shown below:

<u>Title page,</u>
Item [73], replace
"Pioneer Electronics Corporation, Japan" with
-- Pioneer Electronic Corporation, Japan
   Pioneer LDC, Inc., Japan --

Signed and Sealed this

Fifteenth Day of April, 2003

JAMES E. ROGAN
*Director of the United States Patent and Trademark Office*